US011524425B2

(12) United States Patent
Rigamonti

(10) Patent No.: US 11,524,425 B2
(45) Date of Patent: Dec. 13, 2022

(54) ASSEMBLY, PLANT AND METHOD FOR MAKING A PREFORMED SHELL

(71) Applicant: ALEDA SA, Lugano (CH)

(72) Inventor: Daniele Rigamonti, Lugano (CH)

(73) Assignee: ALEDA SA, Lugano (CH)

( * ) Notice: Subject to any disclaimer, the term of this patent is extended or adjusted under 35 U.S.C. 154(b) by 204 days.

(21) Appl. No.: 16/758,546

(22) PCT Filed: Oct. 22, 2018

(86) PCT No.: PCT/IB2018/058205
§ 371 (c)(1),
(2) Date: Apr. 23, 2020

(87) PCT Pub. No.: WO2019/082055
PCT Pub. Date: May 2, 2019

(65) Prior Publication Data
US 2020/0346419 A1     Nov. 5, 2020

(30) Foreign Application Priority Data

Oct. 23, 2017   (EP) ..................................... 17197799

(51) Int. Cl.
*B29C 70/54*     (2006.01)
*B29B 11/16*     (2006.01)
(Continued)

(52) U.S. Cl.
CPC ............ *B29B 11/16* (2013.01); *B29C 37/001* (2013.01); *B29C 70/541* (2013.01); *B29K 2105/253* (2013.01)

(58) Field of Classification Search
CPC ...... B29C 70/541; B29C 37/001; B29C 70/46
(Continued)

(56) References Cited

U.S. PATENT DOCUMENTS 5,843,492 A * 12/1998 McCorry ............... B29C 51/262
425/DIG. 53
9,393,746 B2    7/2016 Luebbering et al.
(Continued)

FOREIGN PATENT DOCUMENTS

DE       102012024060 A1    6/2014
EP           2875931 A1 *  5/2015  ........... B29C 51/082
(Continued)

OTHER PUBLICATIONS

English Translation of Zhang (CN 205326260) (Year: 2016).*
(Continued)

*Primary Examiner* — Matthew J Daniels
*Assistant Examiner* — Hana C Page
(74) *Attorney, Agent, or Firm* — Marshall & Melhorn, LLC

(57) ABSTRACT

An assembly for preforming a reinforced fabric sheet may have at least one frame and a plurality of gripping devices. Each gripping device of the plurality of gripping devices may be suitable for gripping an edge portion of the reinforced fabric sheet. The assembly may have a moving system with a plurality of first moving devices. The movement of each first moving device may be independent of the other first moving devices. Each gripping device of the plurality of gripping devices may be associated with a first moving device. The first moving device may be suitable for moving each gripping device of the plurality of gripping devices independently of the others.

9 Claims, 19 Drawing Sheets

(51) Int. Cl.
*B29C 37/00* (2006.01)
*B29C 70/46* (2006.01)
*B29K 105/00* (2006.01)

(58) Field of Classification Search
USPC .......................................................... 425/556
See application file for complete search history.

(56) References Cited

U.S. PATENT DOCUMENTS

| | | | |
|---|---|---|---|
| 2003/0146543 A1* | 8/2003 | Lebrun | B29C 51/262 |
| | | | 425/398 |
| 2005/0023729 A1* | 2/2005 | Smith | B29C 55/10 |
| | | | 425/391 |
| 2009/0104300 A1* | 4/2009 | Hiroshi | B29C 51/38 |
| | | | 425/110 |
| 2015/0258743 A1 | 9/2015 | Lanard et al. | |
| 2015/0377754 A1* | 12/2015 | Kanade | G01N 3/068 |
| | | | 73/788 |

FOREIGN PATENT DOCUMENTS

| | | |
|---|---|---|
| EP | 2616233 B1 | 11/2016 |
| EP | 2875931 B1 | 11/2016 |
| WO | WO/2014064085 A1 | 5/2014 |
| WO | WO/2017140752 | 8/2017 |

OTHER PUBLICATIONS

European Pattent Office, International Search Report with Written Opinion, issued in PCT/IB2018/058205, dated Feb. 7, 2019, 15 pages, European Patent Office, Rijswijk, Netherlands.

* cited by examiner

ASSEMBLY, PLANT AND METHOD FOR MAKING A PREFORMED SHELL

FIELD OF THE INVENTION

The object of the present invention is an assembly for preforming a sheet of a reinforced fabric, and also a plant comprising said assembly.

In particular, the present invention relates to a preforming assembly of a composite material, for example comprising fibers, such as glass fibers or carbon fibers, both molded but preferably closely woven to form a fabric impregnated with a resin, for example a thermoplastic material, but likewise also multi-layer composite or sandwich fabrics with the insertion for example, of shaped sheets, such as e.g. polyurethane sheets.

The present invention also relates to a method for preforming a sheet of a reinforced fabric.

In particular, said method allows a preformed shell to be made.

BACKGROUND ART

Methods which allow making composite material panels or shells are generally known. A known type of composite material provides the preparation of a matrix containing a closely woven reinforcement, for example made by interweaving or intersecting bundles of pre-impregnated carbon fibers ("prepreg") with thermoplastic material, for example amorphous or semi-cristalline polymer material in which said reinforcement is dispersed, which for example may be in the shape of one or more sheets of carbon fiber fabric or other material for reinforcements, which gives the composite material the desired mechanical properties, but often mainly a desired appearance, commonly known with the generic term of aesthetical carbon fabric.

Known reinforced fabric sheets to be preformed may be impregnated with a thermoplastic adhesive or alternatively may not have a thermoplastic impregnating agent and may be dry preformed.

Components such as panels for bodywork or helmets, suitcases, pieces of equipment, shrouds of frames or hulls, or parts of the fuselage of airplanes, which may serve a structural function they mainly serve an aesthetical function, are increasingly required. Thus, as aesthetical components, the visible design of the reinforced fiber or fabric or material in these components is to be aesthetically ordinary or pleasant or not distorted in the desired design thereof, after the material is formed.

In certain cases, the reinforcement is in the shape of subtle elements such as particles having squat shape or fibers having an elongated shape which are collected in bundles of reinforced fibers, or the reinforcement may consist of fibers now aligned and now intersected with one another to form a fabric having a weft and warp which form an aesthetical design or effect, or the reinforcement may comprise metal plates or films, for example of aluminum. Certain known types of reinforced fibers are carbon fiber, glass fiber and aramid fiber.

An example of reinforced composite material with a reinforcement comprising plates or films is the production of heat shields made of glass fiber composite material with aluminum film to make thermal shielding suitable for example, for coating the mufflers of motor vehicles. The problem here is instead functional since the film which forms an aluminum skin should not be torn or cracked during the forming, thus creating an access path for the heat to the rear parts of the vehicle.

All these components or elements of the reinforcing step for composite materials are defined later with the term "reinforced fabric" or "reinforced fabric sheet", components or elements such as for example: sheets comprising individual fibers and/or bundles of fibers, for example glass fibers, plastic fibers, carbon fibers, steel fibers and/or other fibers or bundles of fibers, and also non-woven fabrics, fabrics interwoven with said fibers or bundles of fibers listed above, films, combinations thereof and multi-layers or sandwiches of them with shaped sheets, for example shaped sheets made of polyurethane or of a honeycomb-shaped material or the like.

In certain typical embodiments, the reinforced composite material is manufactured in the shape of preformed sheets, for example by using specific molds, said preformed sheets forming for example, the core of protective shells of helmets for motorcycles and also of suitcases, or pieces of professional equipment, shrouds of frames of high performance vehicles or shrouds of hulls for boats, and also parts of the fuselage of professional airplanes or bodywork panels of vehicles.

Although they are not solely used to absolve an aesthetical function, such sheets of reinforced composite material often are located in visible portions and therefore one of the main tasks of such sheets of reinforced composite material is the one of appearing aesthetically important, both by means of the orderly arrangement of weft and warp of the bundles of fibers forming an interwoven fabric, and with any designs specifically made by arranging the fibers or bundles of fibers or the reinforced fabric. For example, certain known embodiments of sheets of reinforced composite material have a mesh or fish-bone or checkered type of interweaving.

Typically, sheets of reinforced composite material are made by preheating the fabric pre-impregnated with thermoplastic material in a furnace that due to the raising of the temperature, makes the material plastically deformable, for example rubbery or having ductile behavior, in order to form a pre-impregnated fabric sheet which then is inserted in a mold for preforming as long as it behaves like a ductile material.

After the preforming, by cooling down, the pre-impregnated fabric sheet becomes a shell which maintains the shape set by the mold, or preforming, which may then be consolidated and blocked in the shape thereof by typically coating the preformed shell with one or more layers of thermohardening material to allow the consolidated shell thus obtained to keep the desired shape also under conditions of temperature greater than the glass transition temperature of the material constituting the thermoplastic step.

The step of preheating the reinforced fabric sheet to make it easier to deform is typically provided also in the cases in which sheets of non pre-impregnated fabric are used, i.e. of the type intended to be dry preformed.

It is generally known to proceed with the preforming step by positioning a frame on which the reinforced fabric to be preformed between the half-molds of the preform mold, is stretched out. However, this system necessarily generates imperfections at least in the mutual arrangement of the reinforced elements which form the reinforced fabric, caused by excessive relief and/or stretching of the reinforced fabric sheet to be preformed, thus resulting in an unsatisfactory appearance or splitting or stretching or creases which are aesthetically unpleasant, at times up to causing the sheets of composite material to be concealed in the product to be marketed in order to hide imperfections such as creases and stretching due to the preforming.

In an attempt to reduce the occurrence of such aesthetical imperfections, usually one or more expert operators are assigned with the task of manually keeping stretched certain flaps of the reinforced fabric sheet by manually gripping them while the mold is gradually closed during the preforming, while simultaneously checking that the design is orderly. It is not infrequent for this personnel to have to intervene by manually arranging the reinforced fabric sheet in the cavity of the mold while paying careful attention to avoid distortions and creases. Such a strategy imposes the use of expert personnel and makes it impossible to automate the production process.

An automated preforming method is known from document EP-2875931, which uses a rectangular frame provided with pincers for gripping flaps of a pre-impregnated fabric sheet mounted on mutually sliding opposed profiled bars, said bars forming two opposed sides of the rectangular frame and sliding so that they may move close to each other when moved by an actuator, thus relaxing the fabric during the closing of the mold. The related approaching stroke of such opposed bars is controlled by measuring the descending stroke of the upper half-mold or the closing speed of the two half-molds.

Although partly advantageous in providing a process which may be automated, such a solution substantially does not resolve the problem. By controlling the grip of the pre-impregnated fabric sheet in a synchronous manner on opposed sides, such a solution imposes that all the grips on both opposed sides are necessarily moved. Indeed, the provision of a frame having related synchronized approaching opposed sliding sides is not applicable when the mold has a complex spatial shape without a regular plan in the shape of a square or rectangle.

Similar solutions are also known from documents DE102012024060A1, WO2014/064085, WO2017/140752, U.S. Pat. No. 9,393,746B2 and EP2616233B1.

Such solutions control the grip and the pulling alone of the pre-impregnated fabric sheet over a work plane that forms the continuation of the surface of the sheet, or along a direction dictated by a pulling cable, which does not at all ensure the sheet will follow the complex shape of a forming hollow in a mold, for example of female type, which forces the fabric sheet to be formed to fold—also suddenly—with respect to the edge of the mold or half-mold itself by entering cavities also delimited by walls that suddenly descend with respect to the edge of the mold itself.

These forming conditions have proven to be very difficult to optimize not only in order to avoid the fabric sheet from forming creases but also keeping regular the arrangement of the fibers of the interweaving—therefore with the weft or warp of the bundles of fibers that follow parallel to the curves and corners of the shape of the mold without converging or diverging towards/from each other—thus unpleasantly deforming the fabric or the design arranged thereon or with the created fabric.

Furthermore, none of these known processes allows the automation of the stretching out of the fabric sheet in the cavity of the mold to be ensured without the intervention by an operator, an intervention which, due to safety reasons, should not and must not occur when the mold is moving, thus in fact making impossible to make certain particularly deep forming shapes without deforming the arrangement of the fibers or the bundles of fibers of the fabric sheet.

The need is therefore strongly felt to provide a forming method capable of eliminating, or at least minimizing, the presence of aesthetical defects on a preformed shell, also and especially where the forming occurs in a seat, for example made in a mold or female half-mold.

The need is strongly felt to provide an assembly and an automated method which allow the tensioning and/or the release of the reinforced fabric sheet to be managed to ensure that the reinforced fabric sheet does not undergo stretching or localized creases during the preforming, also when performed with molds having complex three-dimensional spatial shape.

The need is also strongly felt to provide an assembly and an automated method which allow the tensioning and/or the release of the pre-impregnated reinforced fabric sheet to be managed to ensure that the pre-impregnated reinforced fabric sheet does not undergo stretching or localized creases during the preforming, also when performed with molds having complex three-dimensional spatial shape.

SOLUTION

It is an object of the present invention to obviate the drawbacks of the prior art and to provide a solution to the needs mentioned hereto with reference to the prior art.

This and other objects are achieved with an assembly according to claim 1, and also with a plant according to claim 10, and also with a method according to claim 11.

DRAWINGS

Further features and advantages of the assembly, plant and method will be apparent from the description below of preferred embodiments thereof, given by way of non-limiting examples, with reference to the accompanying drawings, in which.

Figure 1:
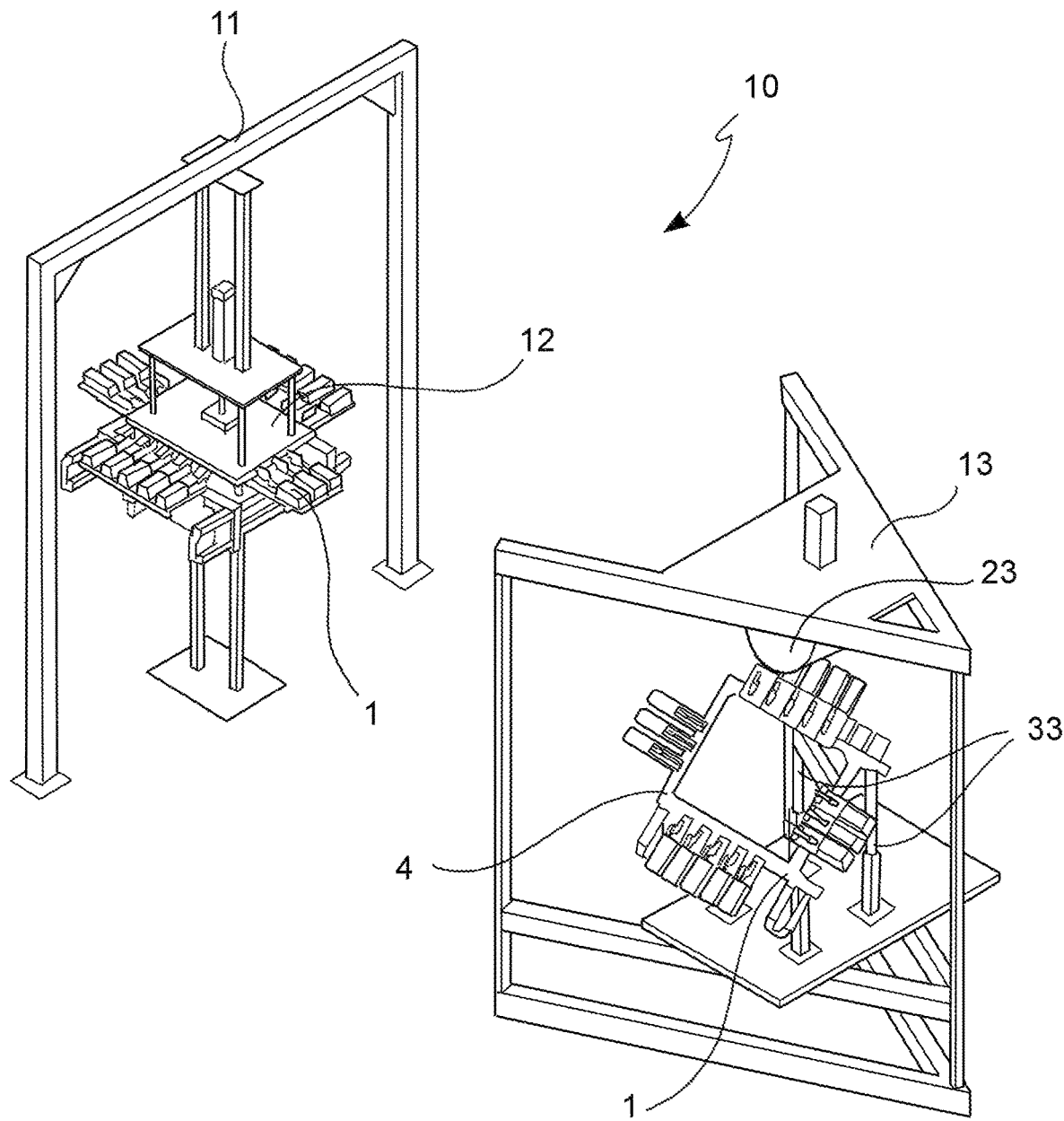
FIG. 1 is an axonometric view which schematizes a plant comprising a preheating station and a preform station according to one embodiment, in which the lower preform half-mold is not shown for clarity, and in which the reinforced fabric sheet is also not shown for clarity.
Figure 2:
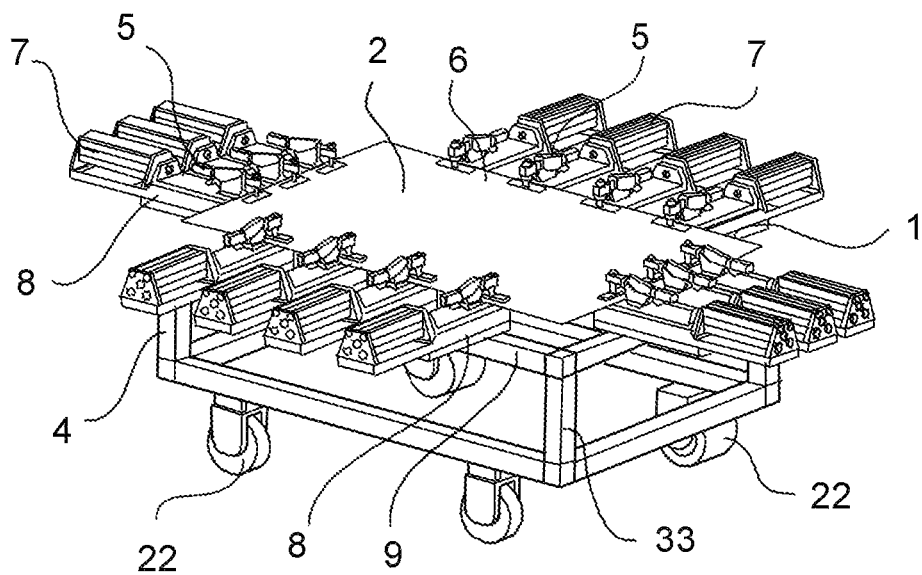
FIG. 2 is an axonometric view of a reinforced fabric sheet mounted on an assembly, according to one embodiment.
Figure 3:
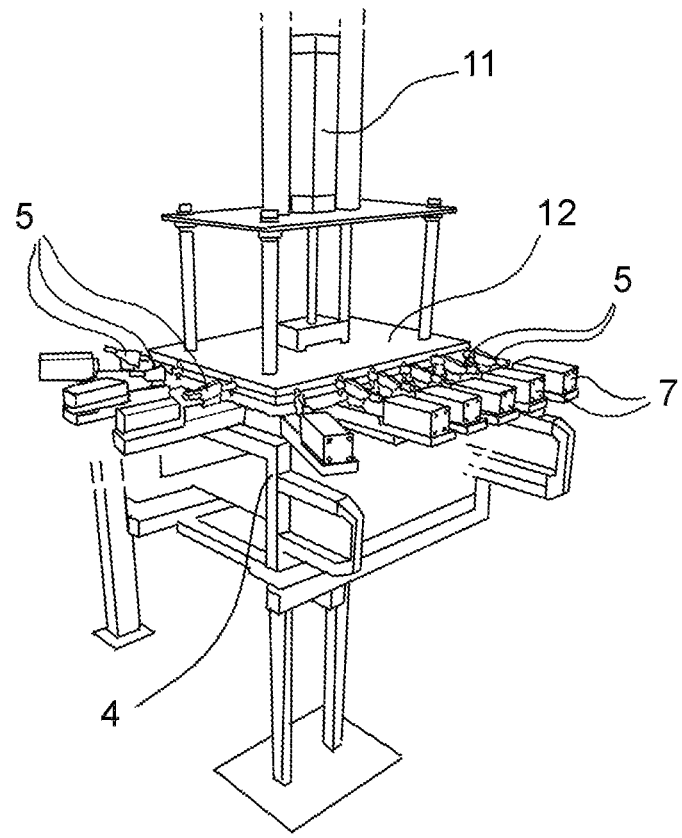
FIG. 3 is a perspective view which shows a preheating station of a plant, according to one embodiment.
Figure 5:
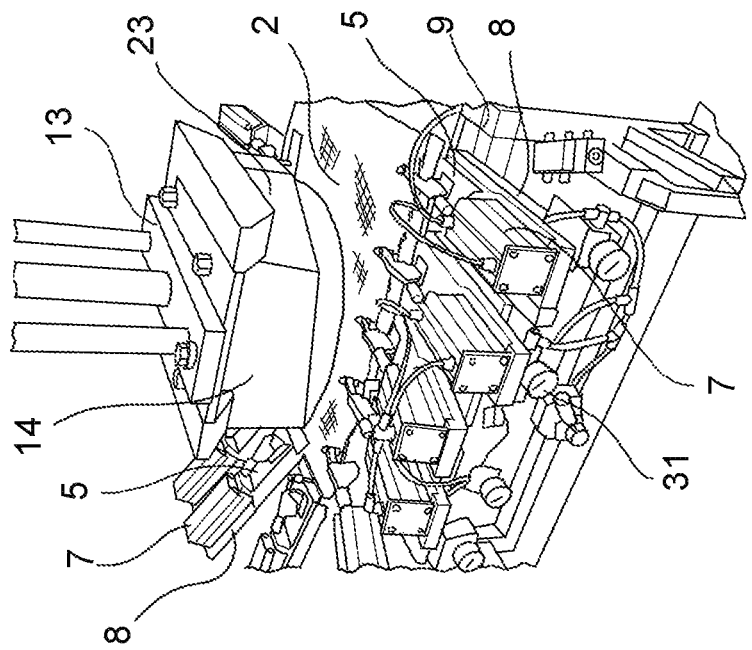
FIG. 5 is an axonometric view of a reinforced fabric sheet mounted on an assembly arranged in a preform station according to one embodiment, during the closing of the preform mold.
Figure 4:
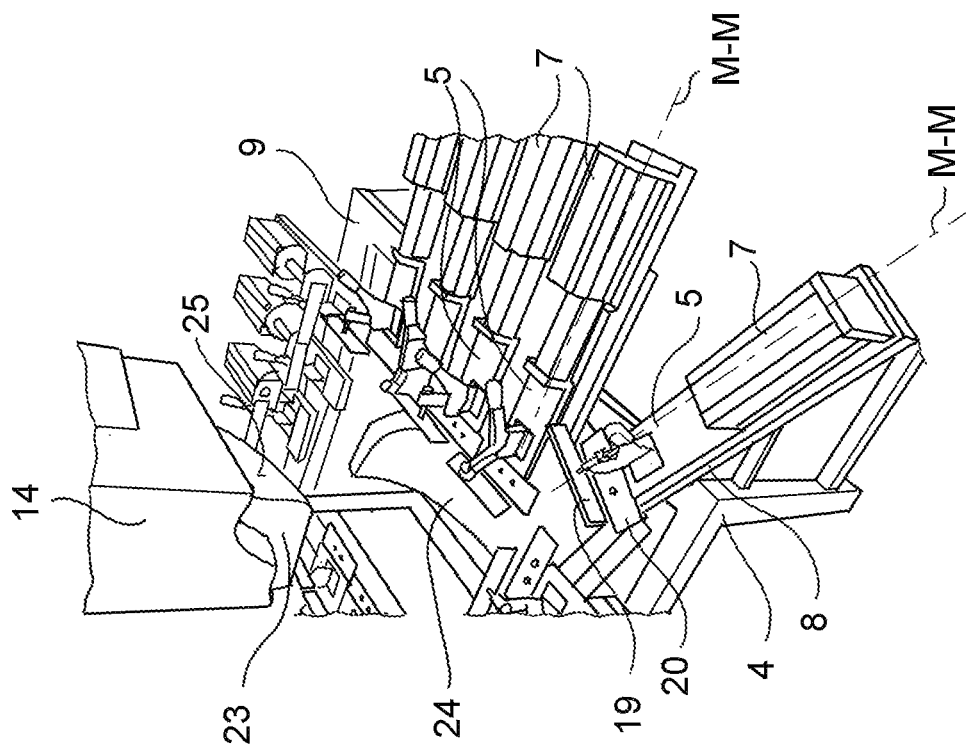
FIG. 4 is a perspective view which shows an assembly arranged in a preform station according to one embodiment, in which the mold is open and the reinforced fabric sheet is not shown for clarity.
Figure 6:
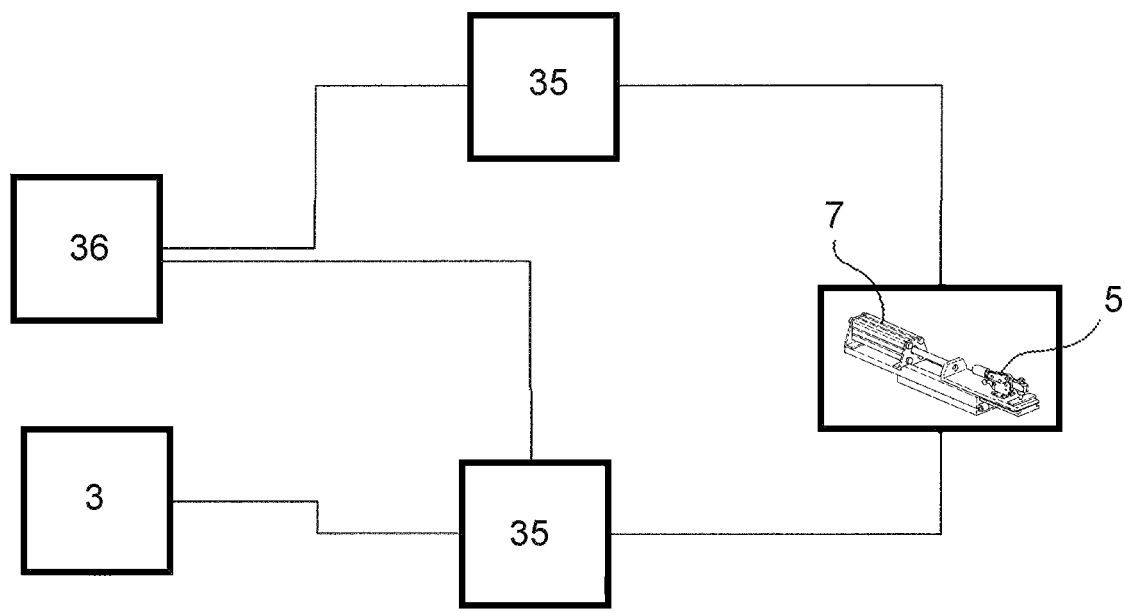
FIGS. 6 and 7 are block diagrams which show a control and operating unit operatively connected to the moving system, according to certain embodiments.
Figure 7:
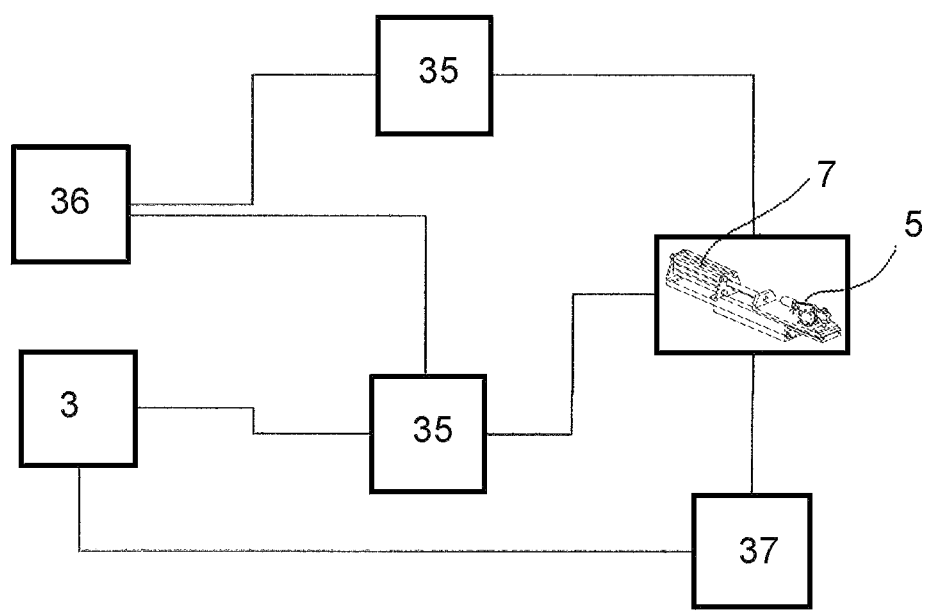
Figure 8:
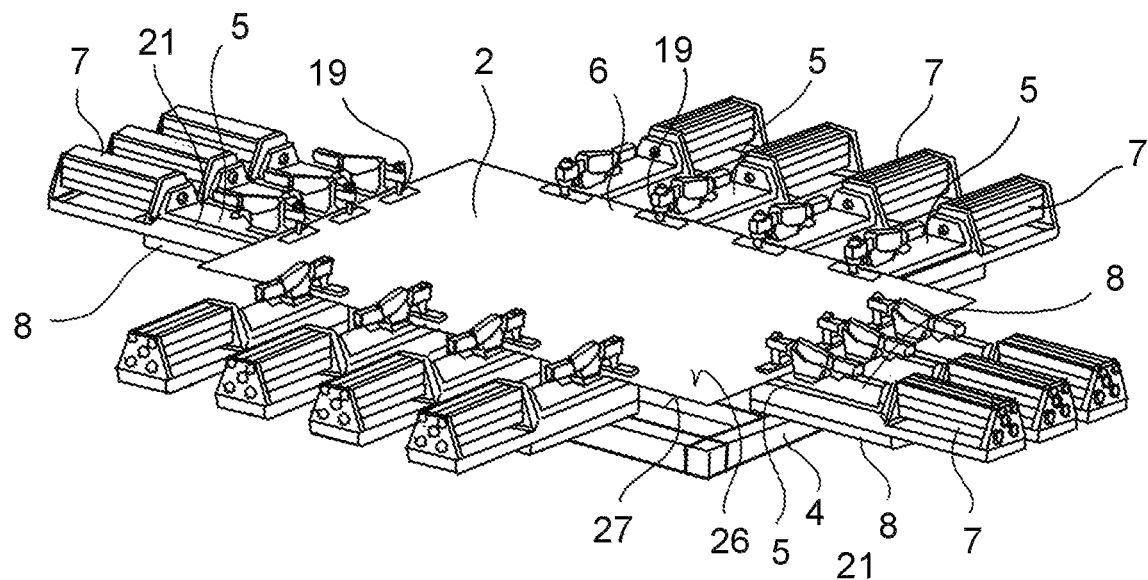
FIG. 8 is an axonometric view which shows a reinforced fabric sheet mounted on an assembly, according to one embodiment.
Figure 9:
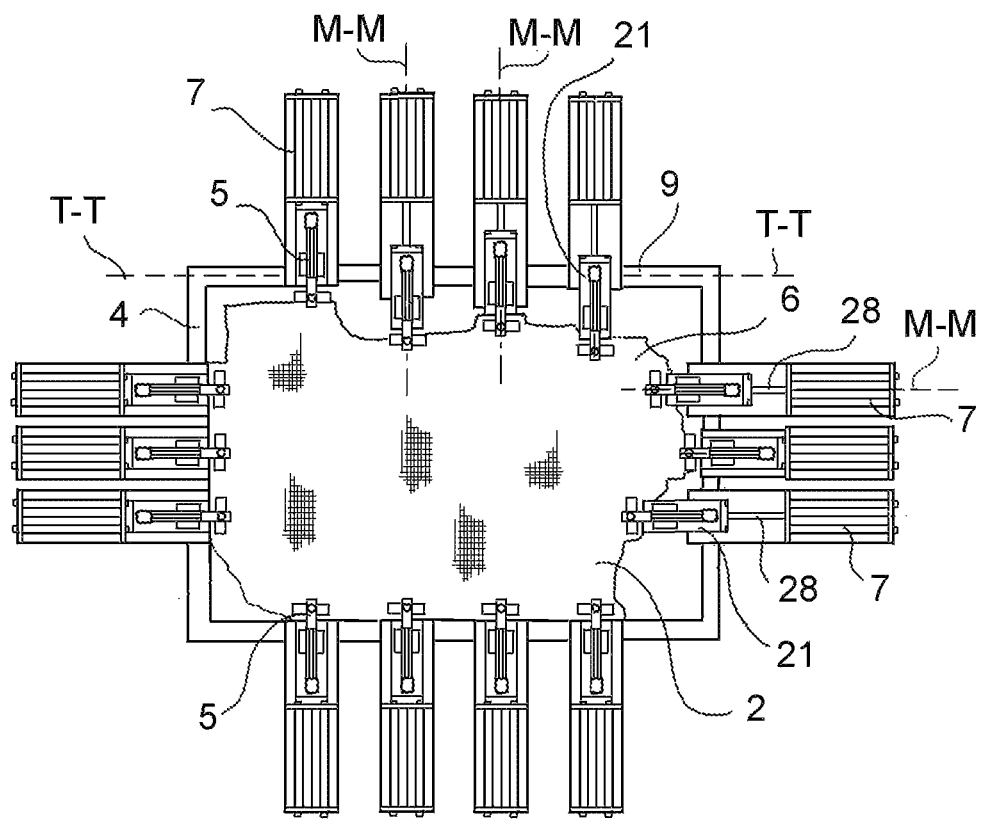
FIG. 9 is a top plan view of a reinforced fabric sheet mounted on an assembly, according to one embodiment.
Figure 10:
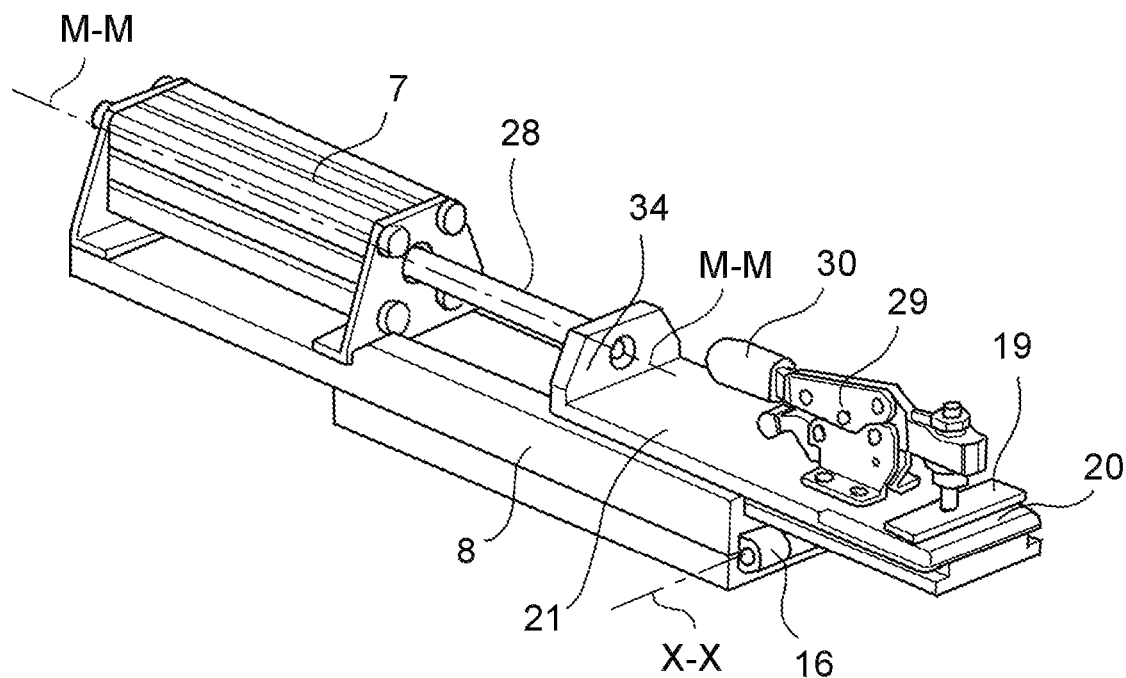
FIGS. 10 and 11 are axonometric views of a gripping device associated with a respective moving device and with a support, according to one embodiment.
Figure 11:
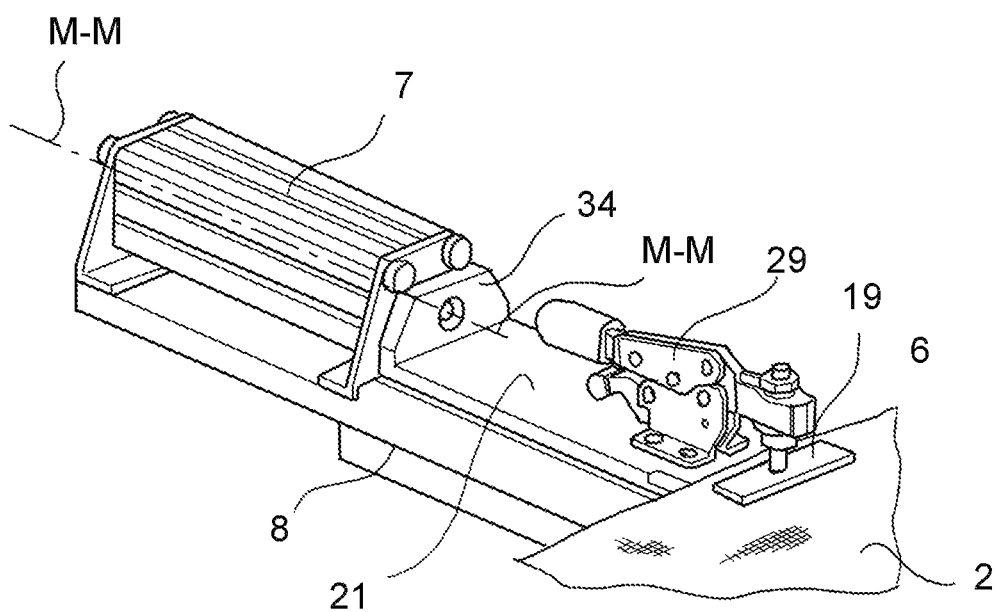
Figure 12:
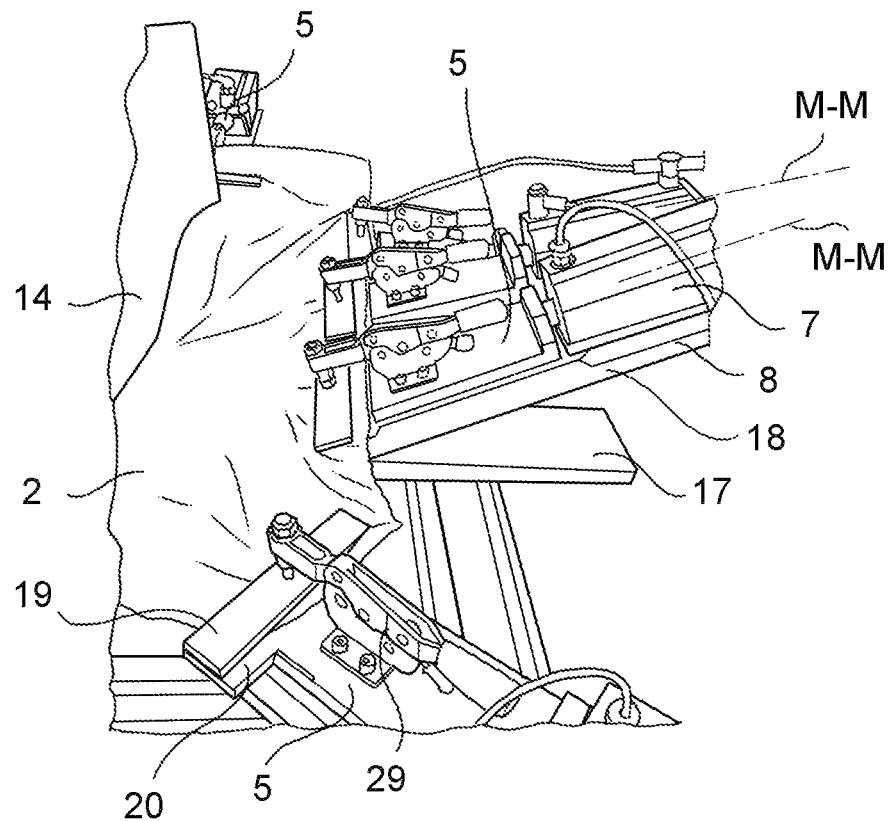
FIG. 12 is a perspective view which shows a portion of a reinforced fabric sheet mounted on an assembly according to one embodiment, and arranged in a preform station during the closing of the preform mold.
Figure 13:
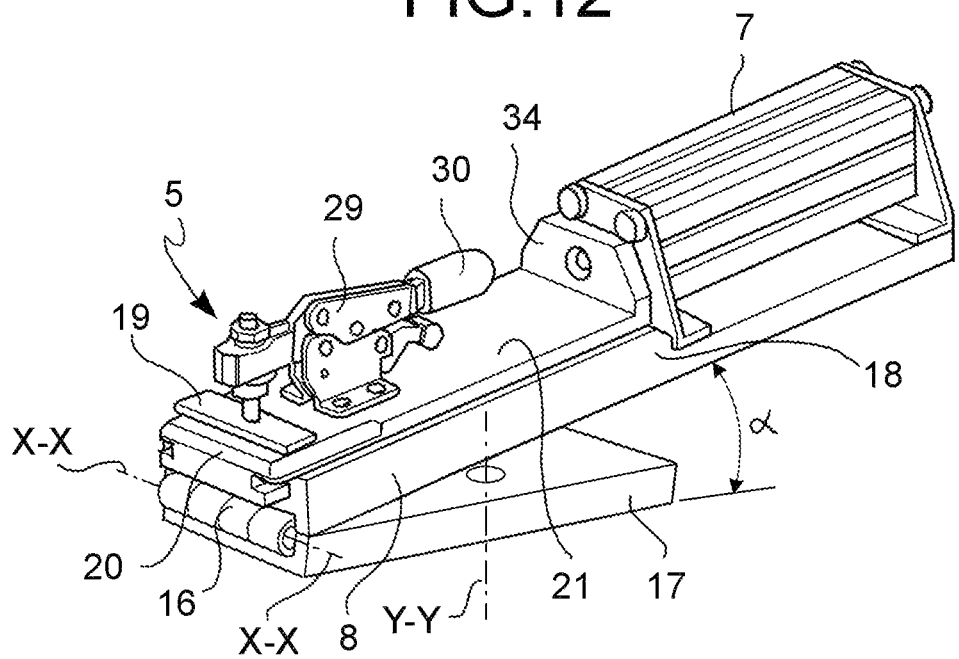
FIG. 13 is an axonometric view of a gripping device associated with a respective moving device and with a support, according to one embodiment.
Figure 14:
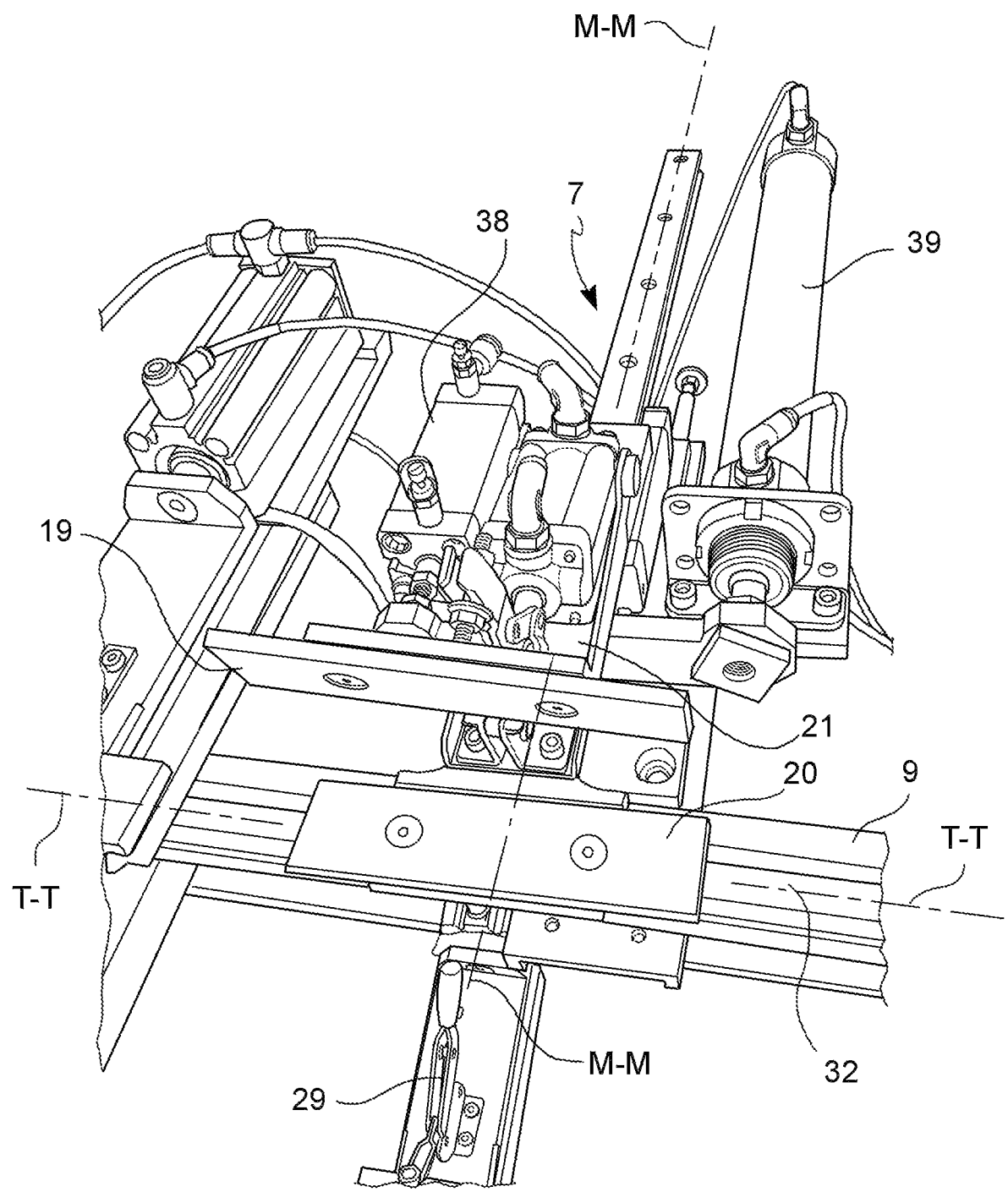
FIG. 14 is a perspective view of a portion of an assembly, according to one embodiment.
Figure 15:
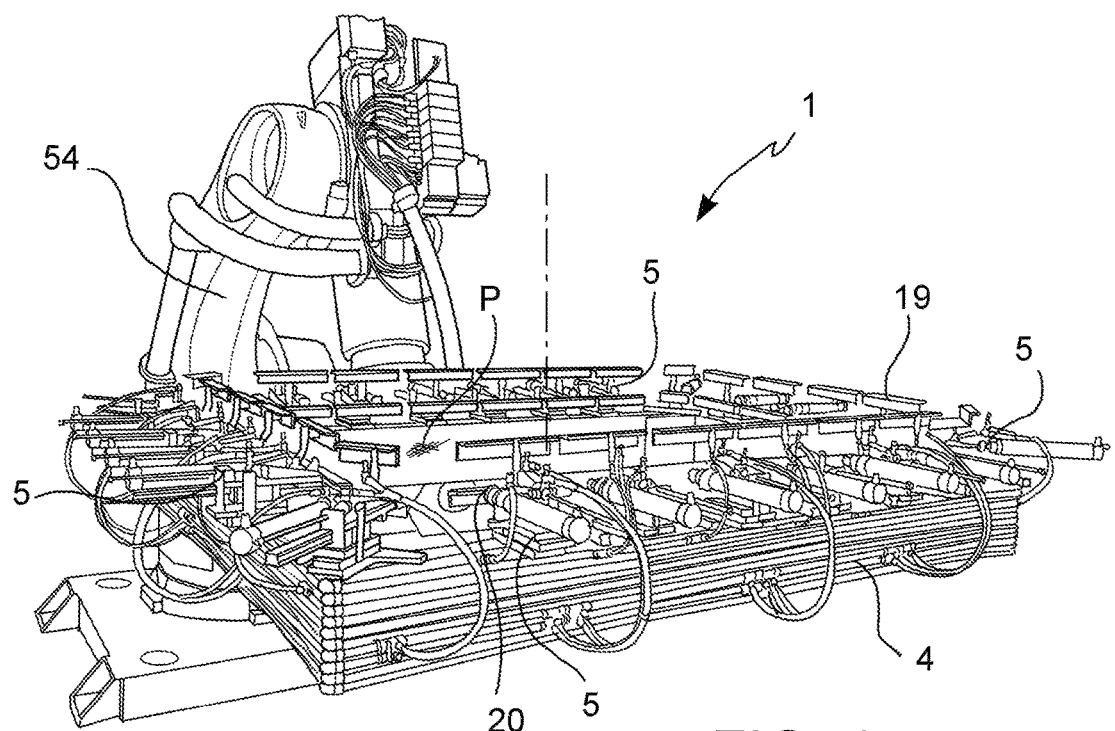
FIG. 15 shows an axonometric view of a further embodiment of the assembly, in which an anthropomorphic robot is connected to a frame and supports and controls a plurality of gripping devices which with the second jaw thereof, in particular the second geometrical coupling surface thereof, defines a frame plane.
Figure 16:
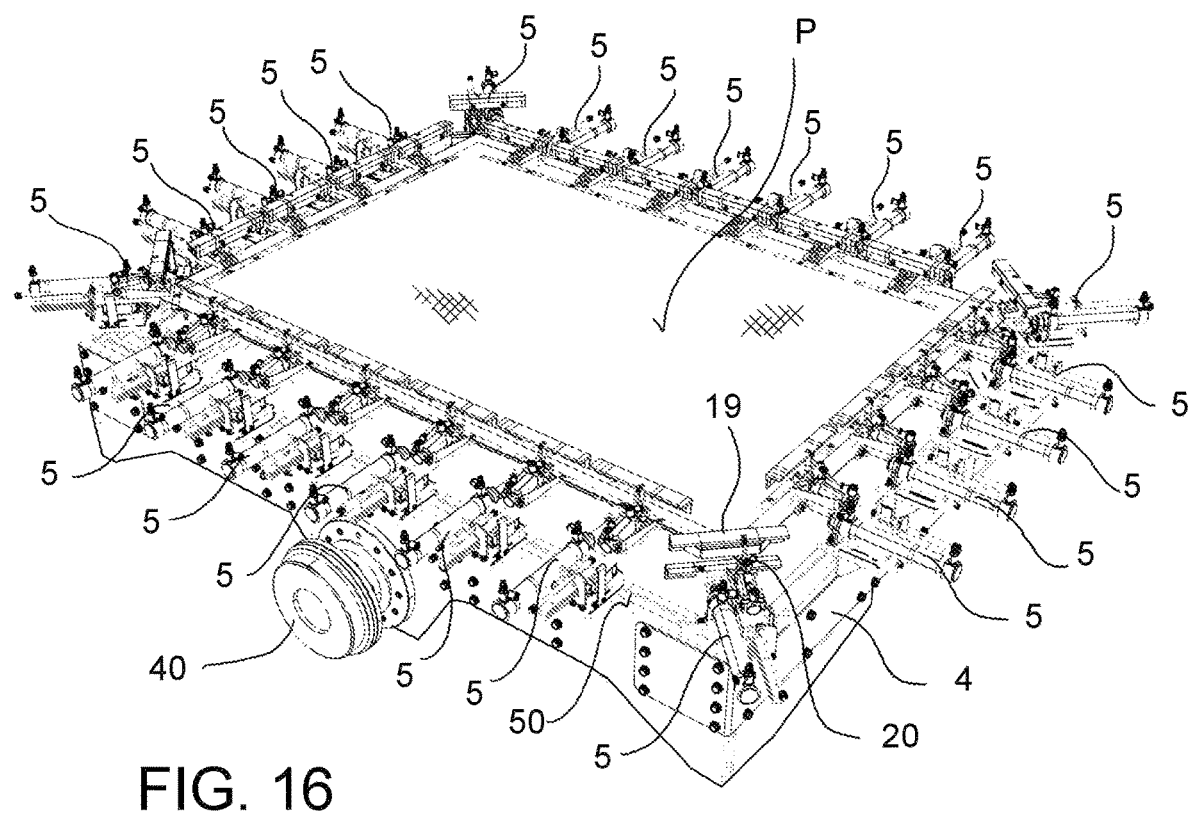
FIG. 16 depicts an axonometric view, or top view, of the frame alone and the plurality of gripping devices of the assembly in FIG. 1, in which the frame plane is noted.
Figure 17:
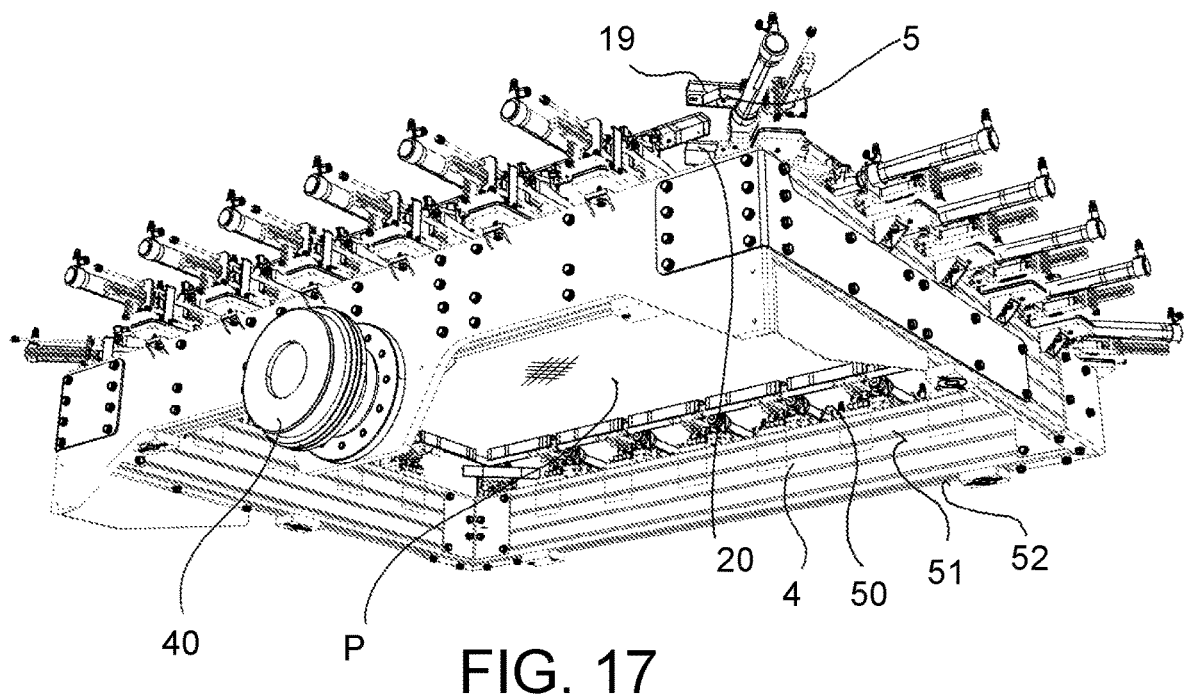
FIG. 17 depicts the components in FIG. 16 in a different axonometric view, or from the bottom.
Figure 18:
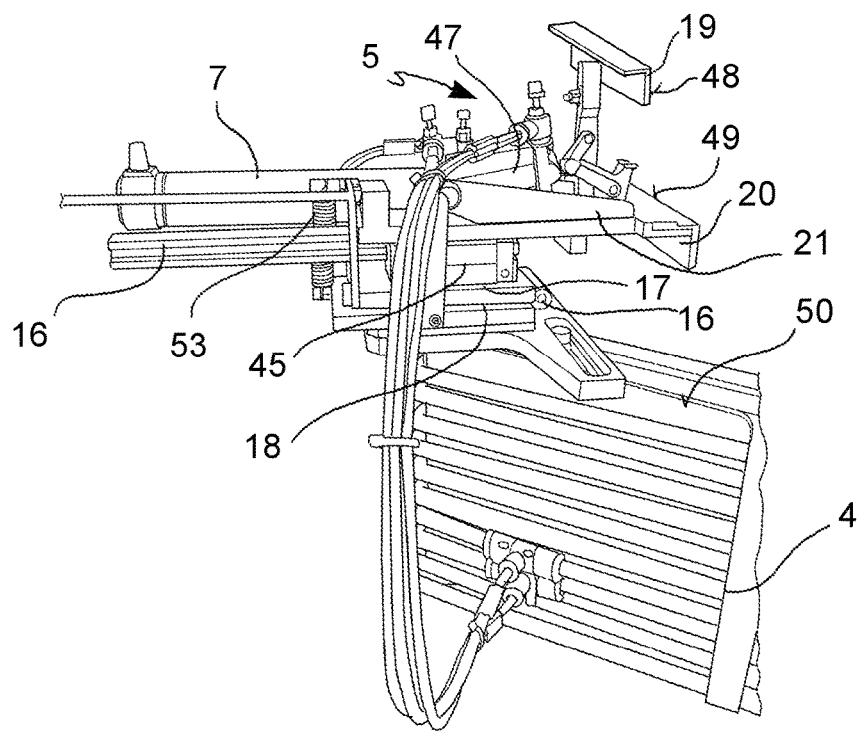
FIG. 18 shows an axonometric view of a detail of a gripping device of the assembly in FIG. 15.
Figure 19:
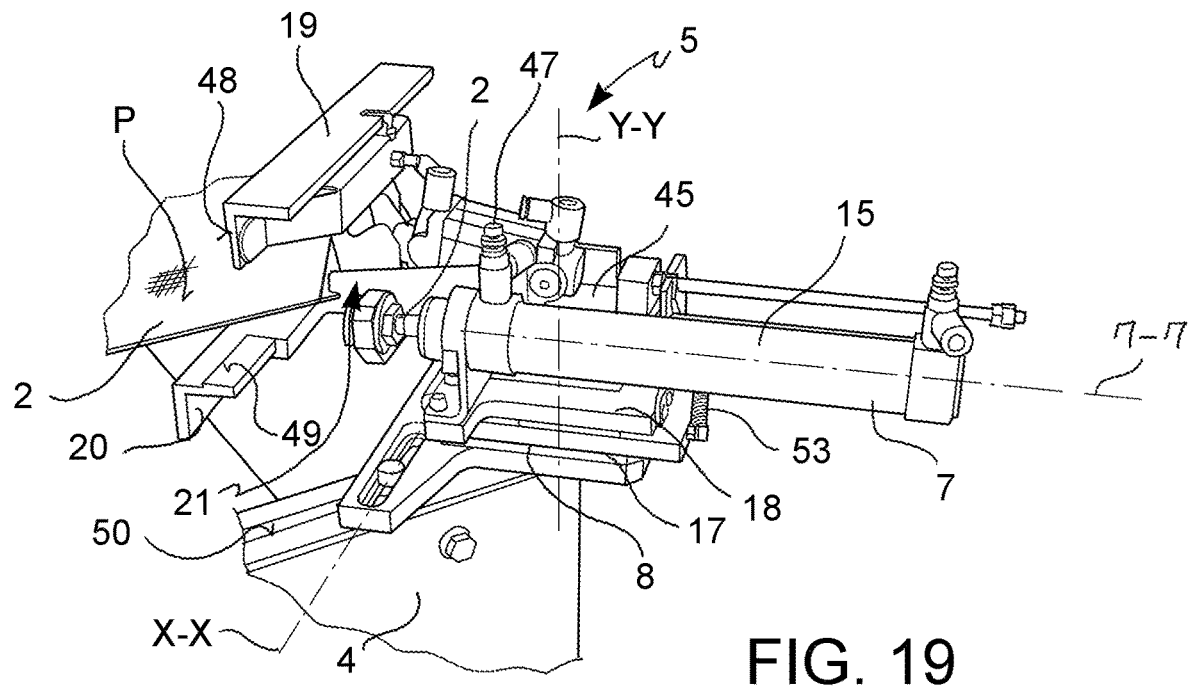
FIGS. 19, 20 and 21 show various axonometric views of the detail in FIG. 18 in which the conduits for adding the supply fluid of the moving devices and actuators, have been removed.
Figure 20:
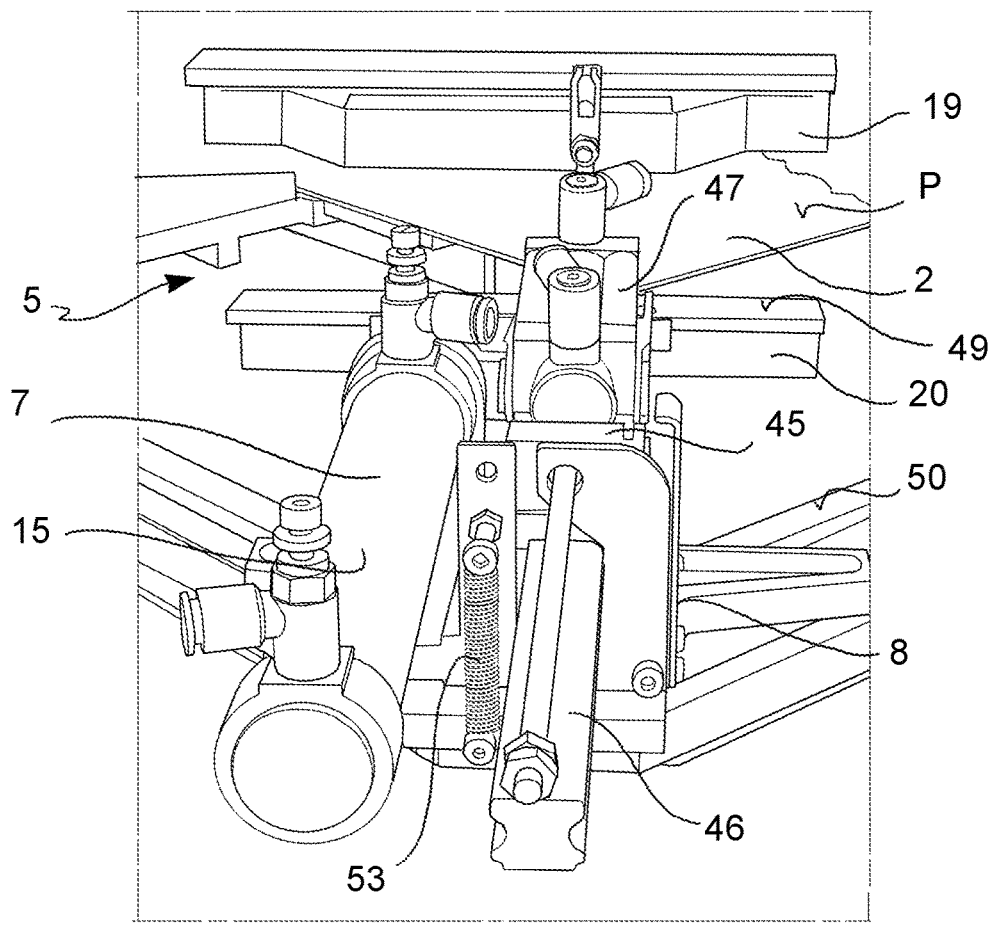
Figure 21:
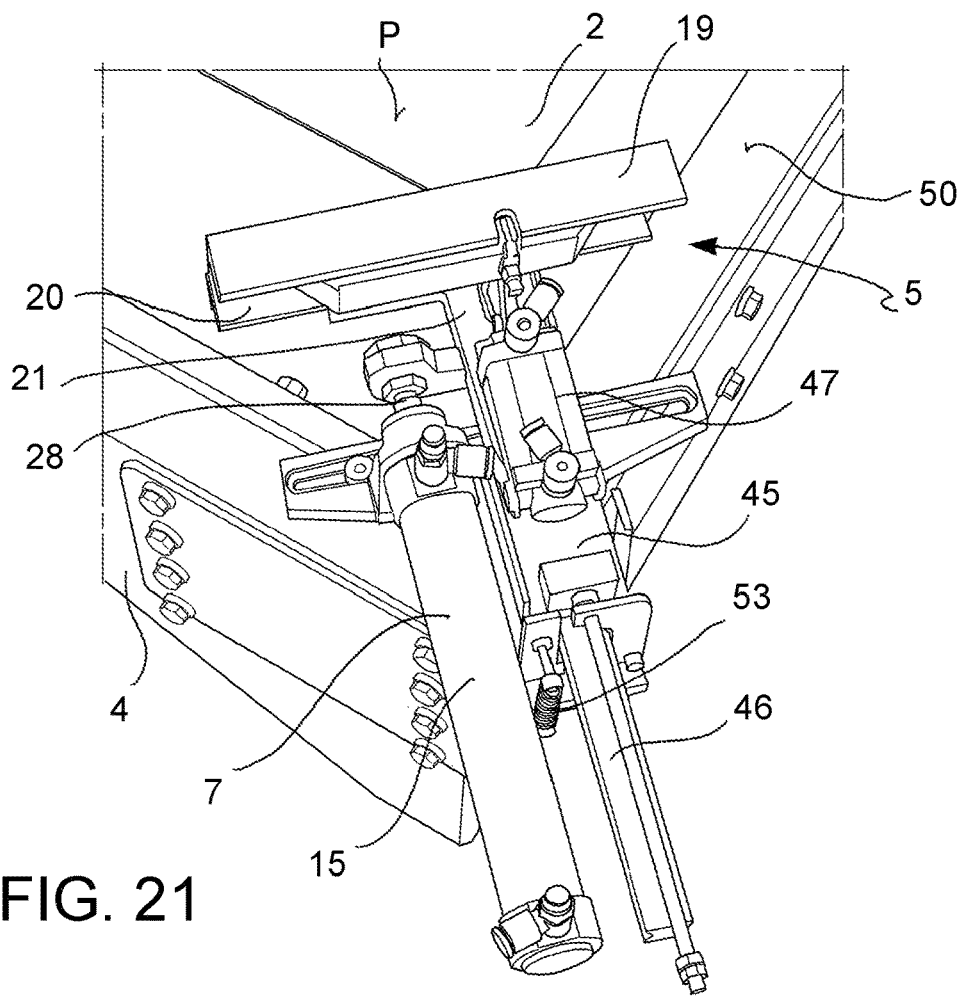
Figure 22:
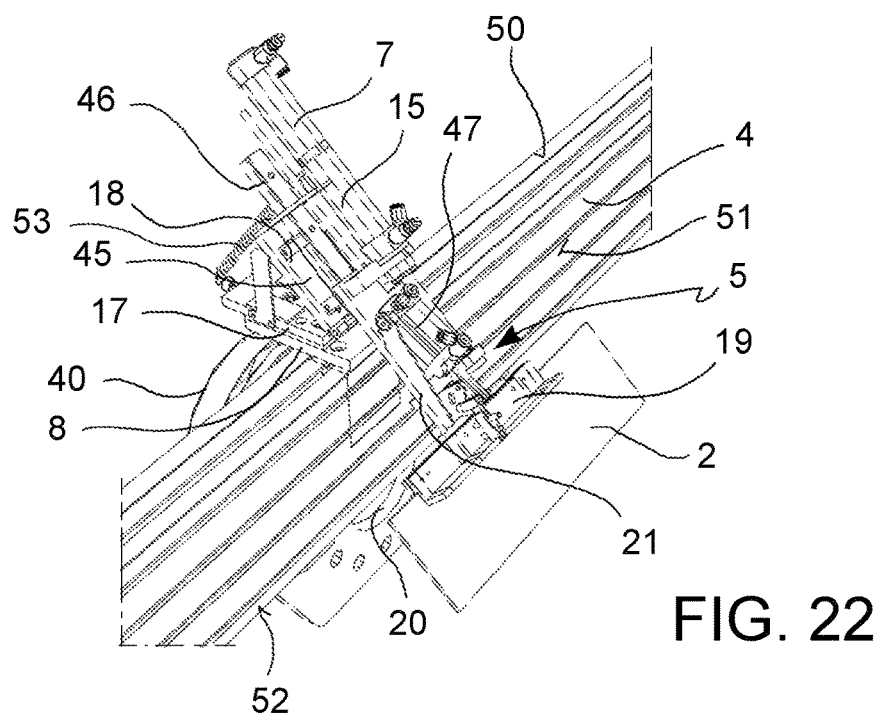
FIGS. 22, 23, 24, 25 show various axonometric views of a detail of a gripping device in an inclined position with respect to the frame plan in which the whole gripping device is oscillated or inclined to guide the action of the reinforced fabric sheet in a direction outside the frame plane.
Figure 23:
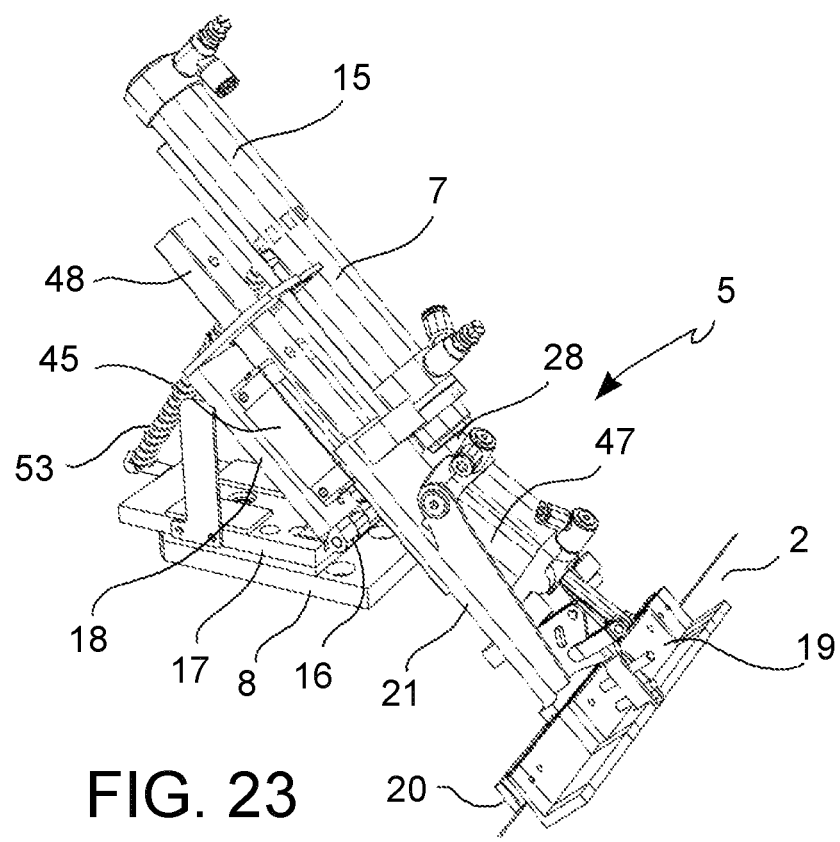
Figure 24:
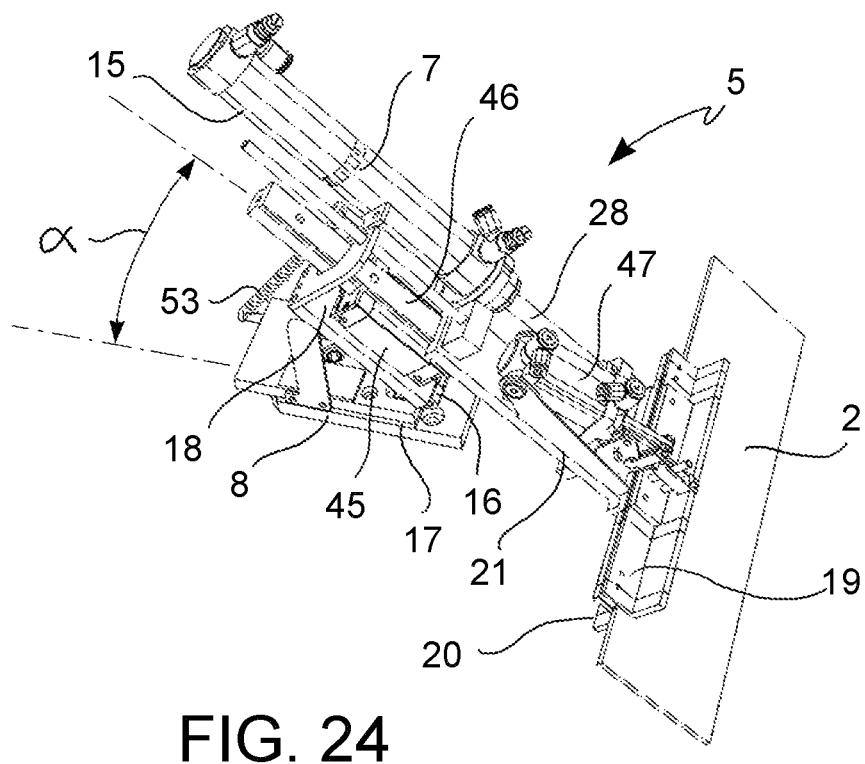
Figure 25:
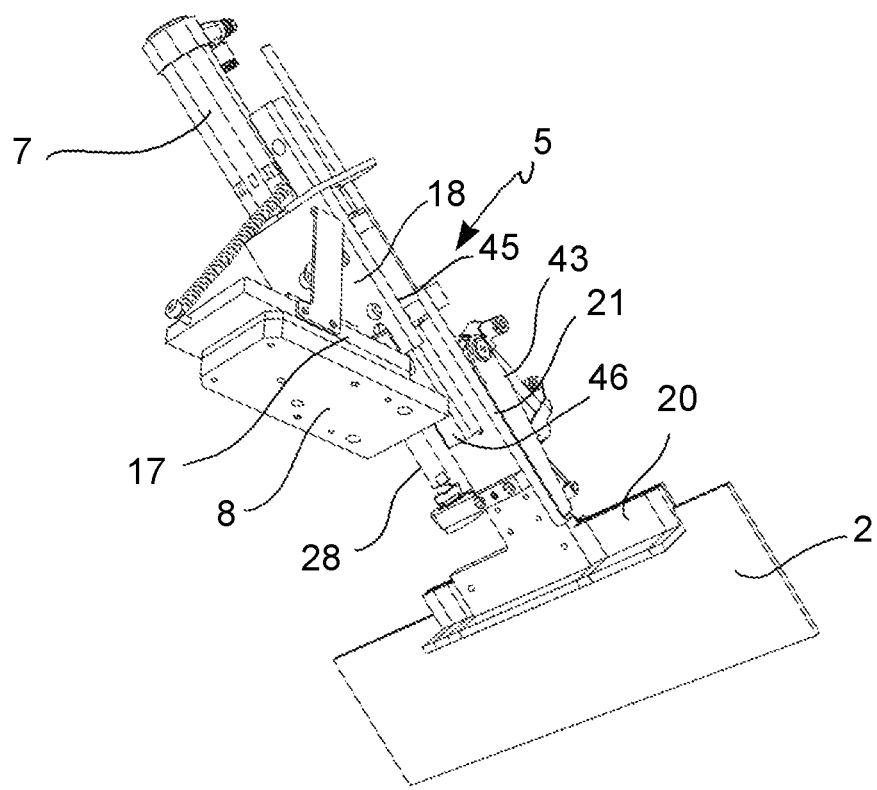
Figure 26:
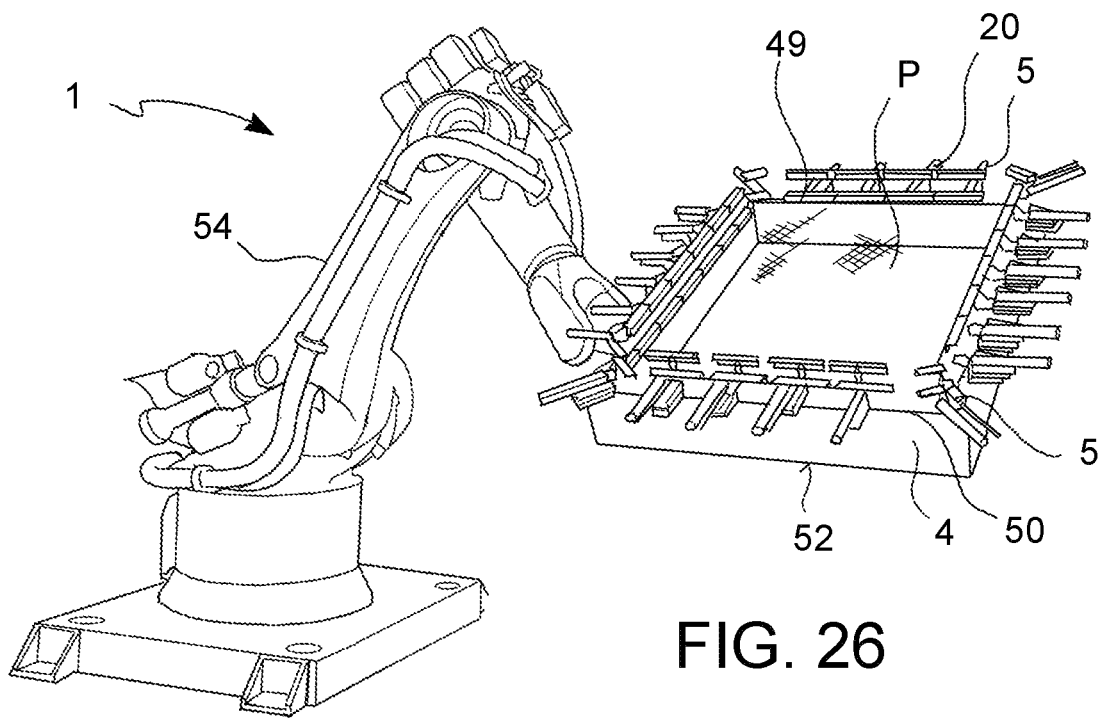
FIG. 26 depicts a schematized axonometric view of the assembly in FIG. 15 in a manipulating step, in particular during a rotation of the frame to bring the gripping devices, with the jaws thereof, in open position and ready to face a reinforced fabric sheet to be gripped and manipulated.
Figure 27:
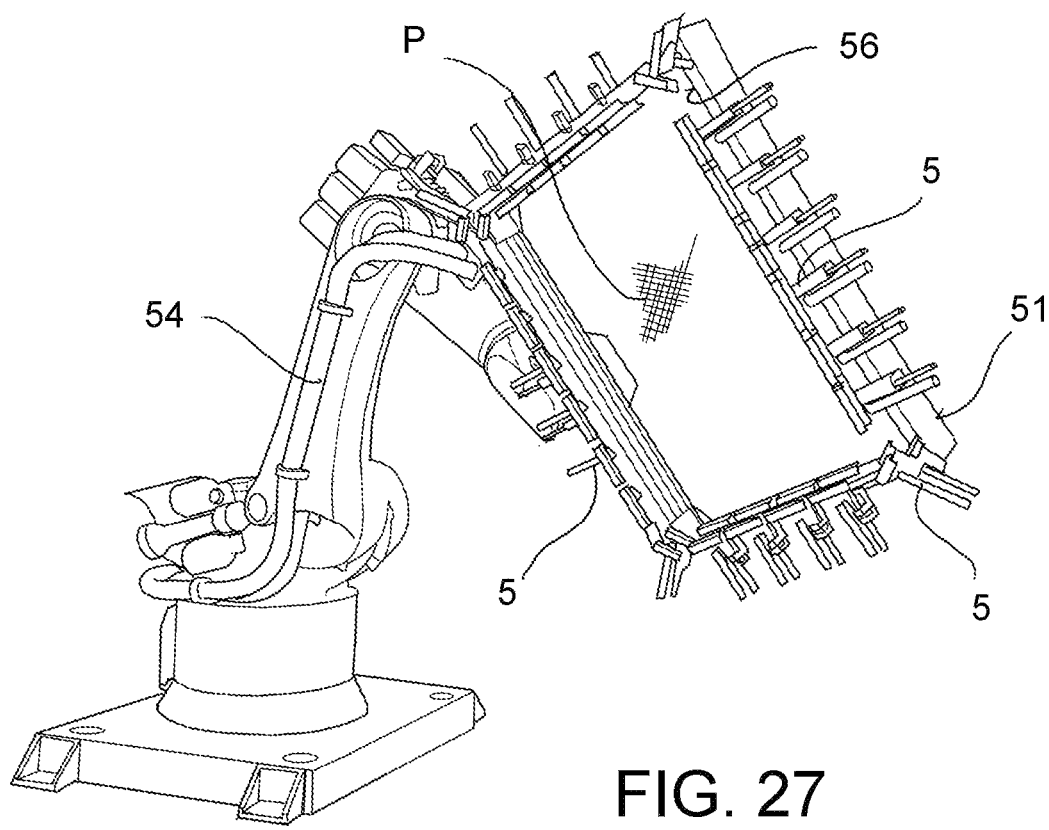
FIG. 27 shows a different axonometric and schematized view of the assembly in FIG. 26, in which the rotation of the frame is almost complete.
Figure 28:
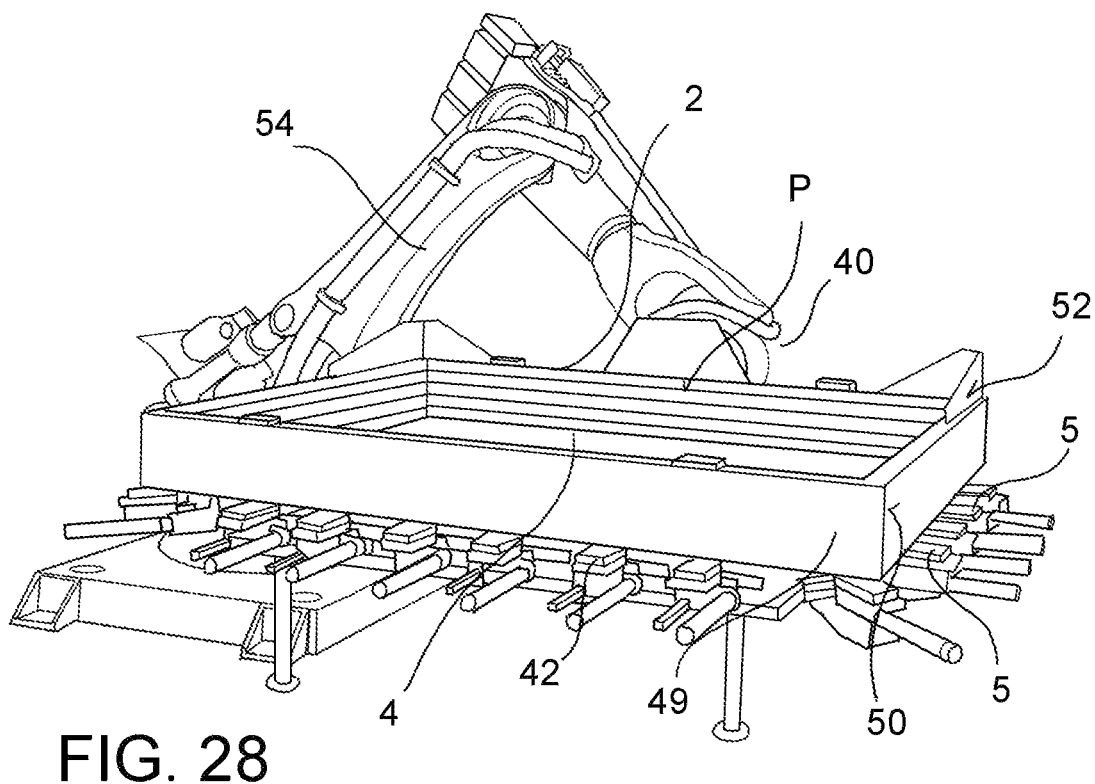
FIG. 28 depicts an axonometric view of the assembly in FIG. 26, in which the frame is completely rotated and faces a support surface of a loading station for picking at least one reinforced fabric sheet to be manipulated.
Figure 29:
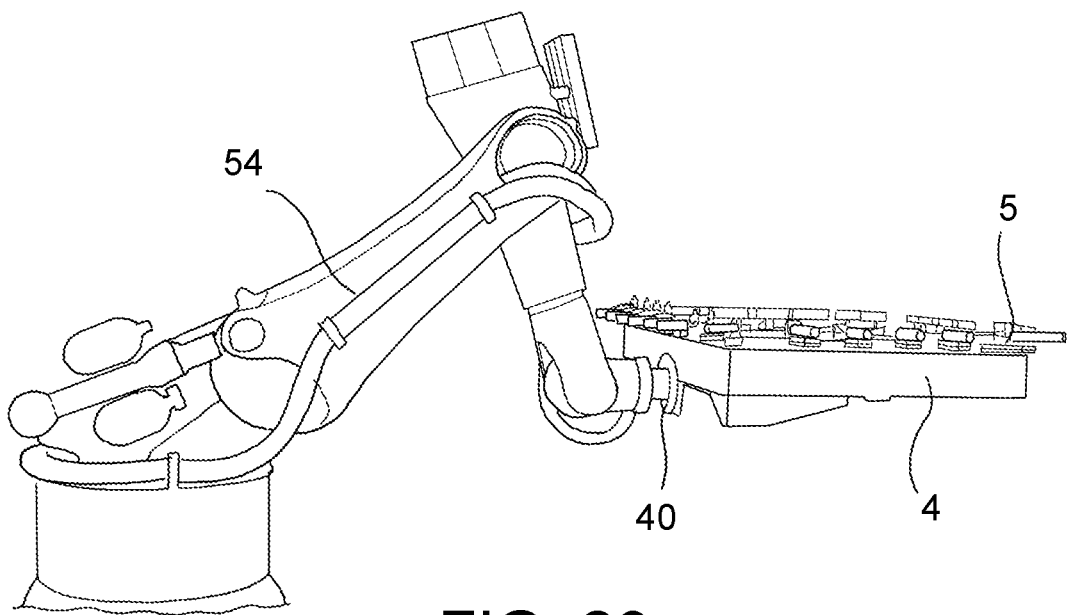
Figure 30:
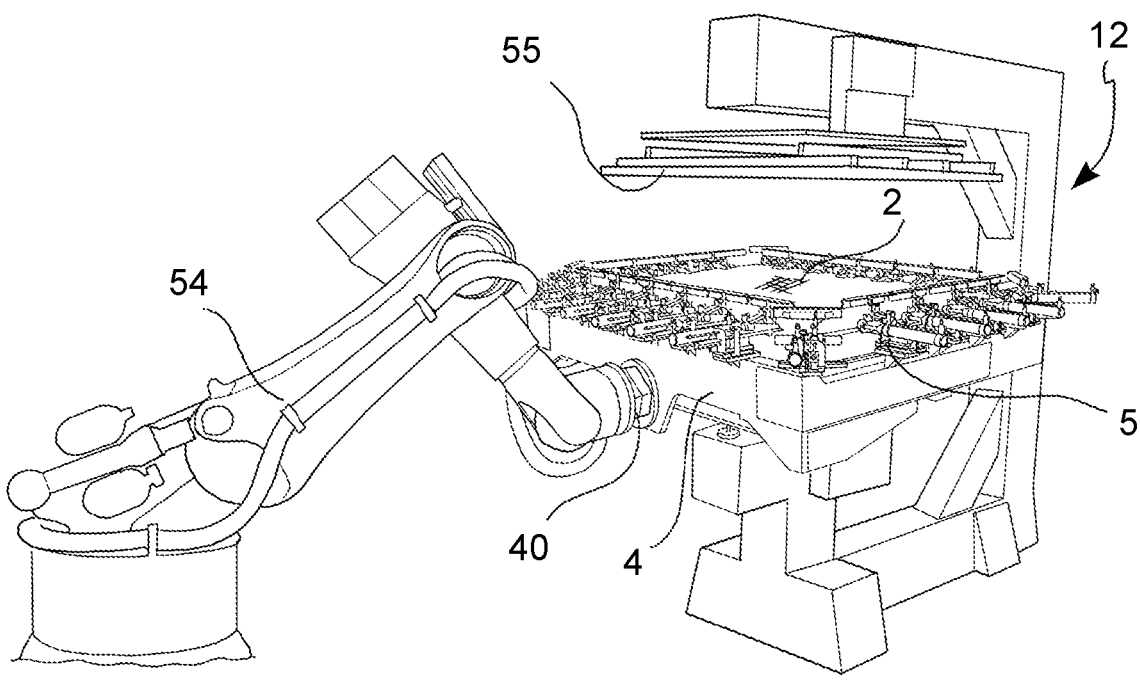
Figure 31:
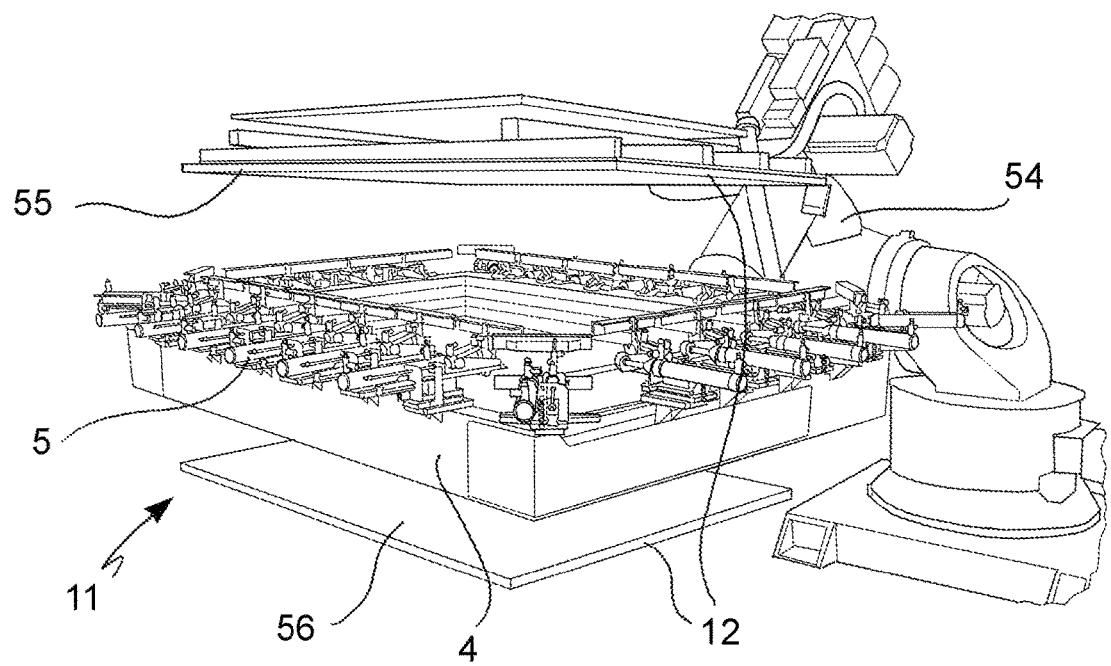
Figure 32:
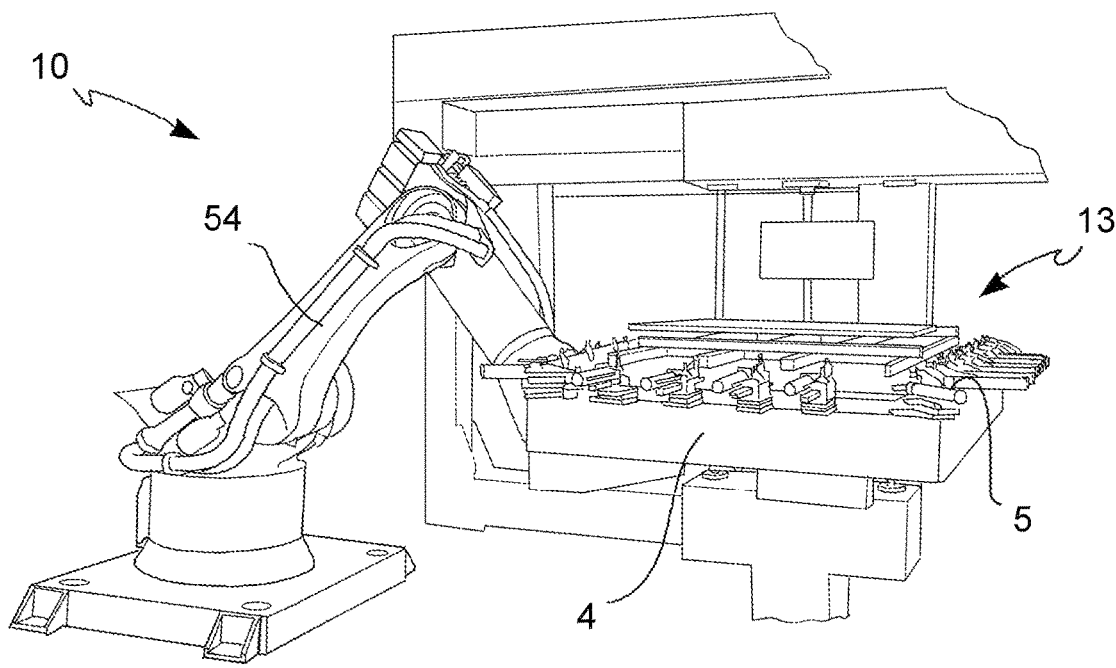
Figure 33:
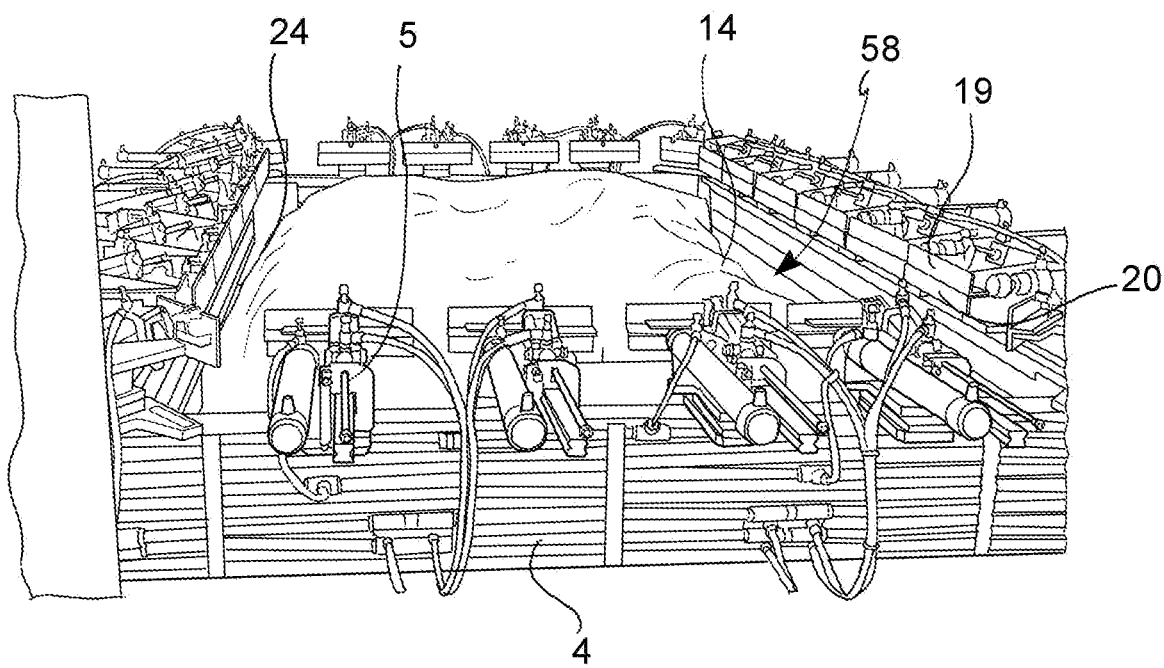
Figure 34:
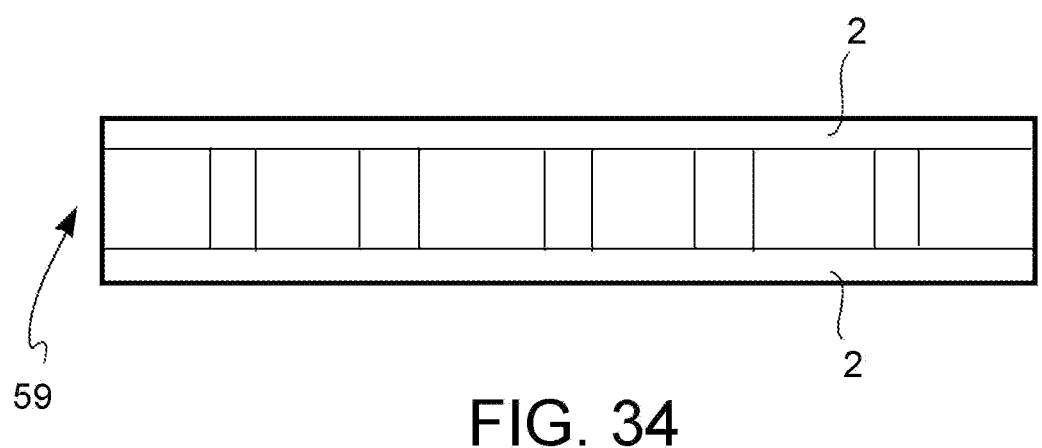
Figure 35:
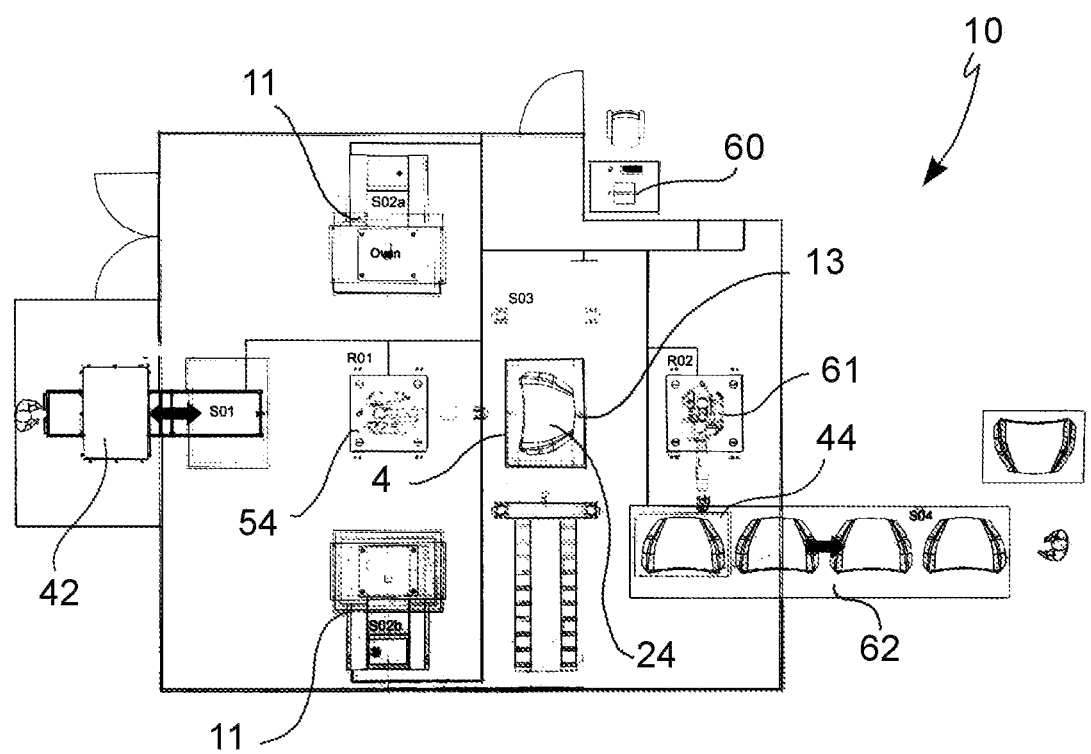
Figure 36:
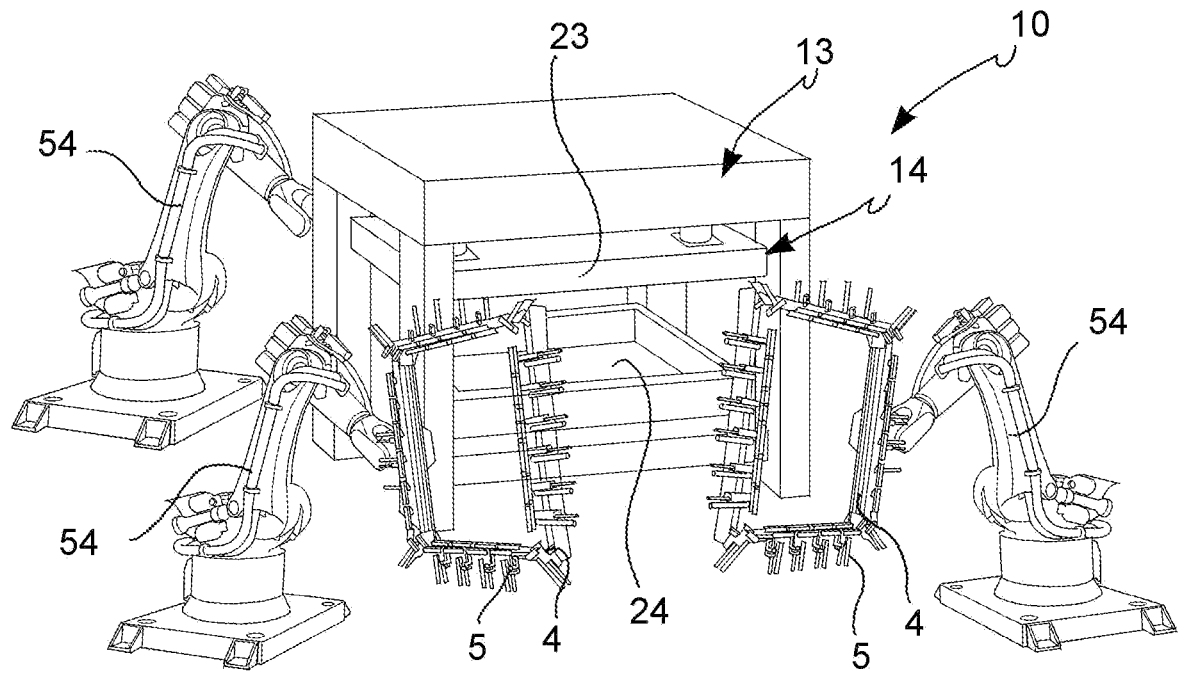

FIGS. 29 and 30 depict a schematized axonometric view of two successive processing steps in which when gripped by the gripping devices, the picked sheet is turned upside-down and brought to a preheating station where the frame is arranged about opposed heating plates which close against the opposite faces of the at least one reinforced fabric sheet gripped by the gripping devices arranged on the frame;

FIGS. 31 and 32 show schematized axonometric views of two successive processing steps in which once the preheating of the reinforced fabric sheet is complete, the preheating furnace plates are opened and the sheet gripped by the gripping devices is moved and brought towards a preform station in which the half-molds are open;

FIG. 33 shows a schematized axonometric view of the assembly in FIG. 26, with the frame placed to surround the lower half-mold, or female half-mold, with the gripping devices arranged on the edge of the half-mold and ready to guide the preheated reinforced fabric sheet into the gap formed by the two closing half-molds by adjusting the pulling of the edge portion of reinforced fabric sheet during the initial forming steps while the half-molds are closing, thus locally avoiding creases and distortions of the fabric;

FIG. 34 shows a schematized side view of a multi-layer composite sheet;

FIG. 35 depicts a schematized top view of a preforming plant in which there are provided a loading station of sheets to be preformed, two opposite preheating stations, a robotic central assembly comprising an anthropomorphic robot which supports a frame on which a plurality of gripping devices is arranged, a press with preforming half-molds, an unloading robot of the preformed sheet, a transport station of the preformed sheets and a control station;

FIG. 36 shows a schematized axonometric view of a detail of a further plant in which three anthropomorphic robots suitable for manipulating support frames are provided about a preforming press in which there are arranged half-molds, the anthropomorphic robots each being suitable for manipulating support frames of a plurality of gripping devices for supplying the mold with two or more pre-shaped sheets or cores for making sandwich components.

DESCRIPTION OF SOME PREFERRED EMBODIMENTS

According to a general embodiment, an assembly 1 for preforming a reinforced fabric sheet 2, is provided. The term "sheet" means an intermediate process product in a flexible structural state, for example plastically deformable.

Preferably, said reinforced fabric sheet 2 is a pre-impregnated fabric sheet (prepreg). The term "pre-impregnated fabric" means a reinforced fabric impregnated with thermoplastic material. According to one embodiment, said reinforced fabric sheet is a fabric sheet impregnated with a thermoplastic adhesive. According to one embodiment, said reinforced fabric sheet 2 is a dry fabric sheet.

Said reinforced fabric sheet 2 is intended to undergo at least one deforming action for making a preformed shell. The term "preformed shell" means a preformed panel, for example in the shape of sheet or dome or shell, having thin thickness but blocked in the shape thereof, which may be a finished product or which may be an intermediate process product, for example an intermediate process product suitable for forming the core of a finished product.

According to one embodiment, said preformed shell forms the core of a finished product, for example the core of the dome of a motor vehicle helmet, the core of a shell of a suitcase, the core of a piece of sports equipment such as e.g. a ski, the core of a bodywork panel, the core of a shell made of aesthetic carbon. According to one embodiment, said preformed shell is consolidated by means of coating with thermohardening material, preferably reticulated material, thus becoming a consolidated shell.

Said assembly 1 comprises at least one frame 4. According to one embodiment, said frame 4 comprises frame cross members 9, e.g. sectioned cross members, each frame cross member 9 having elongated shape which extends according to a longitudinal extension direction of cross members T-T, said frame cross members 9 forming a frame-like structure suitable for giving structural stability to said assembly 1. According to one embodiment, said frame 4 comprises cross members forming a peripheral structure suitable for surrounding, or at least partly surrounding, said reinforced fabric sheet 2. For example, if said reinforced fabric sheet has quadrangular shape, said frame 4 surrounds said sheet 2 and has quadrangular shape. However in certain embodiments, said frame surrounds said reinforced fabric sheet 2 without however following the perimeter or edge portion of the reinforced fabric sheet 6 but in any case surrounding at least most of said sheet, thus leaving a through opening in direction transverse to the surface of said sheet 2. According to one embodiment, said frame 4 further comprises frame uprights. According to one embodiment, said frame 4 comprises ground contact units 22, for example wheels or rollers or shoes, suitable for allowing the movement of frame 4 for example, between adjacent stations in a preforming plant 10.

According to one embodiment, said frame 4 comprises a frame gripping element 40 suitable for selectively connecting, or separately connecting on command, said frame 4 to a manipulator robot 41 suitable for manipulating said frame 4 to go through a loading station 42 to allow the assembly to grip said sheet 2 for example, resting on a support surface 43 so that it may be gripped and manipulated in successive stations, such as for example a preheating station 11 and a preform station 13, and also an unloading station 44.

Said assembly 1 comprises a plurality of gripping devices 5 suitable for gripping the reinforced fabric sheet 2. According to one embodiment, each gripping device 5 comprises two opposed jaws 19, 20 which act in conjunction to grip a portion of the reinforced fabric sheet by pressing said reinforced fabric sheet on opposite sides. Preferably, said opposed jaws 19, 20 are movable with respect to each other to achieve both a gripping action and a release action, opposite to said gripping action, of the portion of the reinforced fabric sheet 2 which is intended to be gripped. According to one embodiment, said gripping device 5 comprises a locking device 29 suitable for locking the related position of the opposed jaws 19, 20, for example when tightened. Preferably, said locking device 29 comprises a safety knob 30 suitable for being gripped by an operator to manually actuate or disable the locking device 29, for example under breakdown or emergency conditions.

Said plurality of gripping devices 5 is directly or indirectly associated with at least one frame 4, for example by means of a support 8.

Each gripping device 5 of said plurality of gripping devices 5 is suitable for gripping an edge portion 6 of the reinforced fabric sheet 2. Preferably, said plurality of gripping devices 5 substantially is in the shape of arms which are movable independently of one another, said arms being provided with said jaws 19, 20 suitable for gripping edge portions 6 of the reinforced fabric sheet 2 the same way as a plurality of hands.

Said assembly 1 further comprises a moving system comprising a plurality of first moving devices 7.

Advantageously, each first moving device 7 is independent in the movement thereof, of the other first moving devices 7 of said moving system.

Even more advantageously, each gripping device 5 of said plurality of gripping devices is associated with a first moving device 7. Thereby, each gripping device 5 is associated with a respective first moving device 7. Preferably, each first moving device 7 is associated with a respective gripping device 6.

According to a preferred embodiment, each first moving device 7 is suitable for moving said respective gripping device 5 of said plurality of gripping devices independently of the others. In other words, each gripping device 5 is intended to be moved independently of the others by a respective first moving device 7. Thereby, when said reinforced fabric sheet 2 is gripped by said plurality of gripping devices 5, each gripping device 5 may move independently of the others to guide localized deformations of the reinforced fabric sheet 2, localized deformations which arise during the deforming action of the reinforced fabric sheet 2.

During the preforming for example, the reinforced fabric sheet 2 gripped by said gripping devices 5 is closed in a preform mold 14 where it undergoes said deforming action, which here is induced by mechanical stress.

The reinforced fabric sheet is allowed to be locally deformed during the closing of the preform mold 14 due to such an assembly 1 comprising gripping elements 5 which are independently movable of one another. Additionally, by approaching the preform mold 14, each gripping device 5 allows such a localized deformation of the reinforced fabric sheet to be accompanied without losing the grip on the respective edge portion 6. Simultaneously during the preforming, the provision of gripping elements 5 which are movable independently of one another allows the reinforced fabric sheet 2 to be kept locally stretched, i.e. a predetermined local pulling tension value to be kept. Preferably, said edge portion 6 of the reinforced fabric sheet 2 is intended to remain outside the preform mold 14 during the preforming.

According to one embodiment, during the preforming said first moving device 7 moves the respective gripping device 5 along a local moving direction M-M both close to and away from said mold 14.

For example, before the preforming, the reinforced fabric sheet 2, for example the pre-impregnated reinforced fabric sheet, gripped by said gripping devices 5, is heated, thus being subjected to said deforming action which here, is thermally induced. According to one embodiment, said first moving device 7 moves the respective gripping device 5 so as to accompany the deforming action induced thermally by heating.

According to a preferred embodiment, the independent movement of each gripping device 5 of said plurality of gripping devices is controlled according to the local force or the local pulling pressure undergone by the reinforced fabric sheet 2 to obtain a local stressing distribution of desired value over the reinforced fabric sheet 2. Thereby, overstressing the reinforced fabric sheet 2 locally, and accordingly as a whole, for example during preforming, is avoided.

According to a preferred embodiment, said assembly 1 comprises at least one sensor which locally detects the force of the pulling pressure undergone by the reinforced fabric sheet 2.

The provision of said at least one sensor allows the independent movement of said gripping devices 5 to be controlled on the basis of information on the local stressing state of the reinforced fabric sheet.

According to a preferred embodiment, said assembly 1 comprises at least one control and operating unit 3 which receives information from said at least one sensor and transmits at least one control signal to the moving system. Preferably, said at least one control and operating unit 3 comprises at least one programmable logical controller or PLC. Preferably, said at least one control and operating unit 3 comprises at least one data processing control unit and at least one control unit operatively connected to said moving system.

According to one embodiment, said first moving device 7 comprises at least one pneumatic actuator 15. In other words, said first moving device 7 comprises at least one pneumatically-operated actuator, preferably comprising at least one cylinder-piston assembly. For example, said pneumatic actuator 15 is an air-operated actuator comprising a cylinder-piston assembly, in which the pressure of the air inside the cylinder of the cylinder-piston assembly locally balances the force of the pulling pressure undergone by the reinforced fabric sheet 2, preferably by the portion of the reinforced fabric sheet 2 gripped by said gripping device 5.

According to one embodiment, said pneumatic actuator 15 is associated with said sensor, in which said sensor detects the pressure of the air inside the cylinder. In other words, when the pneumatic actuator 15 is air-operated, said sensor is a manometer for regulating the pressure of the supply air of the actuator.

According to one embodiment, said moving device 7 comprises at least one electric actuator. In other words, said moving device 7 comprises at least one electrically-operated or electromechanical actuator. For example, said electric actuator is a permanent magnet linear motor, or is a rotary screw motor. According to one embodiment, said electromechanical actuator is associated with said sensor, in which said sensor is a load cell that detects the force or the pressure applied by the electromechanical actuator.

According to one embodiment, said at least one sensor is operatively connected to said control and operating unit 3.

According to one embodiment, said control and operating unit 3 controls the actuation of said moving system in a closed loop feedback manner. For example, the feedback control is based on the information on the local stressing state detected by said sensor. Preferably, said feedback control comprises a feedback branch operatively connected to a position sensor 37 that detects information on the position of said gripping device 5.

According to one embodiment, said control and operating unit 3 controls the actuation of said moving system in open loop.

According to one embodiment, said first moving device 7 is associated with a compressed air actuation circuit which comprises at least one valve 35, preferably a solenoid valve, operatively connected with said control and operating unit 3 and operatively connected with a compressor 36 suitable for providing pressurized air to said first moving device 7. According to one embodiment, said first moving device 7 is operatively connected to said control and operating unit 3 by means of two actuation branches, each of said two actuation branches comprising at least one valve 36, in which said two actuation branches form two counter branches.

According to one embodiment, said at least one sensor is operatively connected to at least one display element 31 suitable for showing information on the local state of tension of the reinforced fabric sheet 2.

According to one embodiment, said first moving device 7 comprises two actuators, for example two counter actuators 38, 39, comprising a first actuator 38 which exerts an initial preload on the reinforced fabric sheet 2 by keeping it stretched during the preheating step, and a second actuator 39 which operates the controlled release in the preforming.

According to one embodiment, said first moving device 7 comprises at least one pair of counter actuators 38, 39. For example, said at least one pair of counter actuators comprises a first actuator 38, or approaching actuator 38, suitable for moving said gripping device 5 close to said preform mold 14 during the preforming of said reinforced fabric sheet 2, and at least a second actuator 39, or distancing actuator 39, a counter actuator with respect to said approaching actuator, and suitable for moving said gripping device 5 away from said preform mold 14 during the preforming of said reinforced fabric sheet 2. In other words, the counter actuators 38, 39 forming said at least one pair of counter actuators are suitable for acting in conjunction to move the gripping device 5 in opposite directions along said local moving direction M-M.

According to one embodiment, said frame 4 is a fixed frame, in which the mutual position and the orientation of the frame cross members 9 forming frame 4 is strictly predetermined. According to one embodiment, said frame 4 comprises two pairs of opposite frame cross members 9 forming a quadrangular frame; in other words, a quadrangular frame-like structure in which each frame cross member 9 supports at least one gripping device 5 and preferably a multiplicity of gripping devices 5 placed side-by-side one another and independently movable of one another at least along said local moving direction M-M.

According to one embodiment, said frame cross members 9 define a frame, in other words a frame-like structure, suitable for surrounding, or at least partly surrounding, and preferably completely surrounding, said reinforced fabric sheet 2. Thereby, the reinforced fabric sheet 2 may be stretched out before the preforming step due to the provision of said gripping devices 5.

Preferably, said frame cross members 9 with which said gripping devices 5 are associated form a frame which defines a frame plane which is substantially parallel or coinciding with said reinforced fabric sheet 2 when gripped by said gripping devices which keep it stretched before the preforming step, and preferably when said reinforced fabric sheet 2 is outside the preform mold 14. Preferably, said frame plane substantially is horizontal or sub-horizontal.

According to one embodiment, said frame 4 comprises at least one telescopically extending frame upright 33, and preferably at least one pair of telescopically extending frame uprights 33. Thereby, frame 4, and in particular said frame plane, may be freely oriented by bringing it to a predefined orientation with respect to the horizontal direction when for example, it is in the preform station 13 of a plant 10. The provision of such telescopically extending frame uprights 33 allows an improved versatility for making preformed shells having complex or irregular shape while ensuring satisfactory features of agreeable aesthetics in the distribution of the weft and the warp of the reinforced fabric sheet 2 during the preforming of the preformed shell.

According to one embodiment, said assembly 1 comprises a plurality of supports 8 directly or indirectly associated with said frame 4, preferably with a frame cross member 9, each support 8 of said plurality of supports 8 also being directly or indirectly associated with at least one gripping device 5 so as to support said at least one gripping device 5. Each support preferably being directly associated with said frame 4 and directly with said gripping device.

Preferably, said assembly comprises a plurality of supports 8 in which each support 8 is associated, preferably directly associated, with a respective gripping device 5 and a respective first moving device 7 so as to support them.

According to one embodiment, said at least one support 8 is hinged to frame 4.

According to one embodiment, said at least one support 8 is associated with frame 4 by means of a spherical joint.

Preferably, said assembly 1 comprises a plurality of supports 8 in which each support 8 is associated with a respective gripping device 5 and at least a respective first moving device 7.

According to one embodiment, said first moving device 7 is fastened to said support 8 and each gripping device 5 further comprises a carriage 21 associated with said support 8 and suitable for translating with respect to said support 8 when moved by said first moving device 7. Preferably, said carriage 21 is fitted on said support 8.

According to a preferred embodiment, said first moving device 7 comprises at least one linear actuator, e.g. a linear pneumatic actuator 15, in which when actuated, a piston 28 of the cylinder-piston assembly exerts at least a thrust action on said carriage 21 of the gripping device 5. Preferably, said linear actuator is suitable for also exerting a pulling action, opposite to said thrust action.

According to one embodiment, said carriage 21 comprises at least one engagement portion 34 which forms an abutment for said first moving device 7 when said first moving device 7 is actuated. According to one embodiment, said at least one engagement portion 34 is integrally fastened with a thrust portion of the first moving device 7, for example with piston 38 of the cylinder-piston assembly of the pneumatic actuator 15.

According to one embodiment, said moving system of said assembly 1 further comprises at least a second moving device, or support moving device, suitable for moving each support 8 independently of the other supports with respect to said frame 4. According to one embodiment, said second support moving device is suitable for moving each support 8 independently of the other supports with respect to said frame 4, and said first moving device 7 is suitable for moving each gripping device 5 independently of the other gripping devices with respect to said support 8.

Preferably, each first moving device (7) is movable independently of each second moving device.

According to one embodiment, said second moving device and said first moving device 7 are the same moving device. In other words, according to one embodiment, said first moving device 7 and said second moving device are integrated in a single component, for example in the form of a cartridge.

According to one embodiment, said second moving device moves said support 8 by a sliding movement in a sliding direction with respect to said frame 4. For example, said sliding direction is orthogonal to said local moving direction M-M. For example, said sliding direction is parallel or coinciding with said local moving direction M-M. For example, said sliding direction is orthogonal and coplanar to the longitudinal extension direction of the frame cross member 9 with which said support 8 of the gripping device 5 is associated.

Preferably, said sliding direction defined by said second moving device substantially is parallel to the longitudinal extension direction T-T of the frame cross member 9 with which said support 8 of the gripping device 5 is associated. According to one embodiment, said frame cross member 9 comprises a guide element 32, for example a track 32, suitable for guiding the sliding movement of said support 8 caused by said second moving device, with respect to frame 4.

According to one embodiment, said second moving device moves said support 8 by a rotary-translational movement about at least one rotation axis X-X or Y-Y with respect to said frame 4. According to one embodiment, said rotation axis X-X or Y-Y is movable with respect to said frame 4, thus defining a rotary-translational movement with respect to said frame 4. According to one embodiment, said rotation axis X-X or Y-Y is fixed and said rotary-translational movement is a rotation movement about said fixed axis with respect to said frame 4.

According to one embodiment, said support 8 comprises at least one support joint 16. Preferably, said support joint 16 is at least one of: a hinge, bushing, spherical joint suitable for forming a ball joint, and a universal joint.

According to one embodiment, said support 8 is associated with said frame 4 by means of said support joint 16 which guides the rotation of support 8 with respect to frame 4. For example, said rotation of support 8 with respect to frame 4 occurs about an axis which is transverse, and preferably orthogonal, to the edge portion 6 of the reinforced fabric sheet gripped by said gripping device 5, when in operating conditions.

According to one embodiment, said support 8 comprises a first plate 17 associated with said frame 4, and a second plate 18 associated with at least said gripping device 5. Preferably, said support 8 further comprises said at least one support joint 16, for example a hinge of support 16, which connects said first plate 17 and said second plate 18 to each other, thus guiding the related rotary-translational movement about a movement axis X-X or Y-Y of said first plate 17 and of said second plate 18, thereby forming an articulated support 8 and defining and inclination angle α between said first plate 17 and said second plate 18 of support 8. According to one embodiment, when actuated, said moving system, preferably said second moving device, moves said second plate 18 in a controlled manner with respect to said first plate 17, thus affecting the inclination angle α.

According to one embodiment, said at least one support joint 16 comprises at least one support hinge which defines a rotation axis X-X or Y-Y lying on a plane substantially parallel to said frame cross members 9 and preferably to the frame cross member 9 with which support 8 is associated. Thereby, said inclination angle α is the angle formed between said plane parallel to the frame cross member 9 with which the first plate 17 of support 8 is associated, and the local moving direction M-M.

According to one embodiment, said moving system comprises at least one elastic element which provides an elastic action which keeps said reinforced fabric sheet 2 preloaded by a predefined pre-tensioning value, by keeping it locally stretched. Preferably, said elastic action provided by the at least one elastic element affects a respective gripping device 5 to move away from the preform mold 14 during the preforming, to keep said reinforced fabric sheet locally stretched.

According to one embodiment, said plurality of gripping devices 5 is distributed, preferably distributed in a uniform manner, along the perimeter of the reinforced fabric sheet 2. According to one embodiment, said plurality of gripping devices 5 are arranged substantially equally spaced between one another to surround said reinforced fabric sheet 2 while each gripping an edge portion 6 of the reinforced fabric sheet.

According to a general embodiment, a plant 10 for preforming a reinforced fabric sheet 2 comprises at least one assembly 1 according to anyone of the embodiments described above.

According to a preferred embodiment, said plant 10 comprises at least one preheating station 11, comprising at least one preheating furnace 12.

According to a preferred embodiment, said plant 10 comprises at least one preform station 13, comprising at least one preform mold 14.

According to one embodiment, said at least one preform mold 14 comprises at least two half-molds 23, 24 which cause the preforming shape; during the preforming, said at least two half-molds 23, 24 tighten and cause the subsequent deformation of the reinforced fabric sheet 2 to form said preformed shell. Preferably, said two half-molds are mutually shaped. Preferably, said preforming shape has a curved shape. In other words, at least one of said at least two half-molds 23, 24 comprises at least one convex face 25.

According to one embodiment, said at least one preheating station 11 is integrated with said at least one preform station 13. For example, at least one of said half-molds 23, 24 comprises at least one heating element, for example by heat radiation and/or by heat conduction.

According to one embodiment, said plant 10 comprises an automatic feeding device suitable for transporting said reinforced fabric sheet 2 from said preheating station 11 to said preform station 13. Preferably, said automatic feeding device is suitable for transporting said assembly 1 from said preheating station 11 to said preform station 13. For example, said automatic feeding device comprises at least one robotic arm, for example of the SCARA type, and/or at least one conveyor belt.

According to one embodiment, said frame 4 defines a frame plane P passing through said frame and which defines a plane in which the reinforced fabric sheet 2 is placed when, gripped by said plurality of gripping devices 5, it is held stretched, raised off all other supports or molds or half-molds.

According to one embodiment, second geometrical coupling surfaces of second jaw 49 define a frame plane P.

According to one embodiment, said frame 4 is suitable for surrounding said reinforced fabric sheet 2 to grip an edge portion of the reinforced fabric sheet 6 with said plurality of gripping devices 5 and to exert a controlled pulling and/or thrust action [different from an action of a spring or a weight which are constant over time] in a direction both of the frame plane P and outside the frame plane P, thus allowing an inclined arrangement of the reinforced fabric sheet 2 with respect to said frame 4 and in particular, to said frame plane P.

According to one embodiment, each of said gripping devices 5 of said plurality of gripping devices 5 is connected to said frame 4.

According to one embodiment, a first support plate 17 is comprised between said gripping device 5 and said frame 4. Said first support plate 17 is connected to said frame 4.

According to one embodiment, a second support plate 18 is comprised between said gripping device 5 and said first support plate 17.

According to one embodiment, said second support plate 18 is connected rotating to said first support plate 17 so as to oscillate and be positioned also tilted with respect to said frame 4 and/or with respect to said frame plane P.

According to one embodiment, at least one support shoe 45 is comprised between said gripping device 5 and said second support plate 18.

According to one embodiment, said gripping device 5 is connected to a support guide 46.

According to one embodiment, said support guide 46 is slidingly housed in said support shoe 45.

According to one embodiment, said gripping device 5 comprises at least a first gripping device jaw 19 which acts in conjunction with a second gripping device jaw 20. At least one of said first and second gripping device jaw 19, 20 is movable so as to move away from and/or close to the other gripping device jaw 20, 19, thus opening and closing said gripping device 5.

According to one embodiment, said assembly further comprises a jaw control device 47. Said at least one of said first and second gripping device jaw 19, 20 is connected to said jaw control device 47 for opening said at least one of said first and second gripping device jaw 19, 20 in a controlled manner.

According to one embodiment, said first support plate 17 is connected to said frame 4 in a rotating manner.

According to one embodiment, said first support plate 17 is connected to said frame 4 in a rotating manner about a rotation axis Y-Y arranged orthogonal to said frame plane P.

According to one embodiment, said first support plate 17 is connected to said frame 4 in a rotating manner and is elastically and constantly stressed in a predefined angular position.

According to one embodiment, said first support plate 17 is connected to said frame 4 in a rotating manner and the angular rotation thereof is controlled.

According to one embodiment, said first support plate 17 is connected to said frame 4 in a rotating manner and the angular rotation thereof is operated in a controlled manner.

According to one embodiment, said second support plate 18 is constantly stressed towards said first support plate 17.

According to one embodiment, said second support plate 18 is elastically and constantly stressed towards said first support plate 17.

According to one embodiment, the oscillation of said second support plate 18 is controlled with respect to said first support plate 17.

According to one embodiment, the oscillation of said second support plate 18 is operated in a controlled manner with respect to said first support plate 17.

According to one embodiment, said assembly 1 comprises a support plate spring 53, and in which said spring 53 is connected, with a first end thereof, to said first support plate 17, and to said second support plate 18 with the opposite end.

According to one embodiment, said first gripping device jaw 19 comprises a first geometrical coupling surface of first jaw 48.

According to one embodiment, said second gripping device jaw 20 comprises a second geometrical coupling surface of second jaw 49. Said first geometrical coupling surface of first jaw 48 geometrically couples with said second geometrical coupling surface of second jaw 49 when said gripping device 5 is in closed position, thus forming a winding clamping path therebetween for the gripping or grasping of said reinforced fabric sheet 2.

According to one embodiment, said frame 3 comprises a frame upper edge 50, a frame inner edge 51 facing said reinforced fabric sheet and adjacent to said frame upper edge 50, and a frame lower edge 52, opposite to said frame upper edge (50) and adjacent to said frame inner edge 51.

According to one embodiment, said plurality of gripping devices 5 is arranged on said frame upper edge 50.

According to one embodiment, said plurality of gripping devices 5 each comprises a first gripping device jaw 19 suitable for acting in conjunction with a second gripping device jaw 20 to grip an edge portion 6 of a reinforced fabric sheet 2. Said second jaw 20 overhangingly protrudes from said frame upper edge 50 to form an overhanging support surface when said gripping device 5 is in an open positon ready to move close to said edge portion 6.

According to one embodiment, said first jaw 19 is moved away from said second jaw 20, leaving a path orthogonal to a second geometrical coupling surface of second jaw free from obstacles to allow the reinforced fabric sheet 2 to approach resting on said second jaw 20.

According to one embodiment, said assembly comprises a manipulator robot or device 54. Said robot 54 is connected to said frame 4 to manipulate said frame in a controlled manner.

According to one embodiment, said robot 54 operates said plurality of gripping devices 5 to open and close.

According to one embodiment, said robot 54 manipulates said frame 4 to pick at least one reinforced fabric sheet 2 and/or to bring said sheet 2 to a preheating station 11 and/or to bring said sheet 2 to a preform station 13 and/or to extract said preformed sheet 2 from a mold 23, 24.

A method for preforming a reinforced fabric sheet for making a preformed shell, is described below.

According to a general embodiment, a method for preforming a reinforced fabric sheet 2 for making a preformed shell comprises the following steps.

Providing at least one reinforced fabric sheet 2. Preferably providing at least one pre-impregnated or prepreg reinforced fabric sheet. Preferably, said at least one reinforced fabric sheet comprises two opposite faces of reinforced fabric 26, 27, an edge of reinforced fabric which defines the perimeter of said reinforced fabric sheet 2, and a plurality of localized edge portions 6 close to said edge of reinforced fabric.

Gripping a plurality of respective edge portions 6 of the reinforced fabric sheet 2 with a plurality of gripping devices.

Exerting at least one deforming action of the reinforced fabric sheet 2.—Preferably, said at least one deforming action of the reinforced fabric sheet 2 is a plastic deforming action. For example, said at least one deforming action is a thermally induced plastic deforming action, for example using a preheating furnace 12. For example, said at least one deforming action is a preforming action.

Moving at least one gripping device 5, and preferably each gripping device 5, independently of the others so as to guide localized deformations of the reinforced fabric sheet 2 which arise during the deforming action of the reinforced fabric sheet. Preferably, this step is performed automatically. Preferably, this step is performed by controlling the local stressing state of the reinforced fabric sheet 2 and/or by detecting the local stressing state of the reinforced fabric sheet 2 and/or by monitoring the local stressing state of the reinforced fabric sheet 2 within a predefined period of time.

According to a further different method, the further steps of exerting at least one pulling and/or thrust pressure action on said reinforced fabric sheet 2, are comprised.

According to a further different method, the further steps are comprised of exerting at least a pulling and/or thrust pressure action on said reinforced fabric sheet 2 in a direction arranged outside a plane passing through a support frame 4 of said reinforced fabric sheet 2.

According to a further different method, the further steps are comprised of exerting at least a pulling and/or thrust pressure action on said reinforced fabric sheet 2 in a direction arranged outside a plane P passing through said reinforced fabric sheet 2, said plane P being defined when gripped by said plurality of gripping devices 5 when said sheet 2 is not resting on any other support, while said pulling or thrust action being exerted when said sheet 2 interacts with a mold 14 or half-mold 23, 24.

According to a further different method, the further steps are comprised of providing a frame 4 which at least partly surrounds said reinforced fabric sheet 2 and provides pluralities of gripping devices 5 arranged on said frame 4.

According to a further different method, the further steps of providing pluralities of gripping devices 5 in open position, are comprised.

According to a further different method, the further steps are comprised of providing a plurality of open gripping devices 5 with the plurality of surfaces thereof or second geometrical coupling surfaces of second jaw 49 which define a frame plane P.

According to a further different method, the further steps of arranging a reinforced fabric sheet 2 on a support surface or loading station 57, are comprised.

According to a further different method, the further steps are comprised of moving said frame 4 close to the reinforced fabric sheet 2 with the second geometrical coupling surfaces of second jaw 49 facing said sheet 2.

According to a further different method, the further steps are comprised of tightening or closing said plurality of gripping devices 5 with a first geometrical coupling surface of first jaw 48 and gripping said sheet 2.

According to a further different method, the further steps of raising said sheet 2 gripped by the gripping devices 5, are comprised. According to a further different method, the further steps of moving said sheet 2, are comprised.

According to a further different method, the further steps of bringing said sheet 2 into a preheating station 12, are comprised.

According to a further different method, the further steps are comprised of surrounding said preheating station 11 so that the gripping devices 5 may retain said sheet 2 without interfering with a preheating furnace 12, e.g. opposite heating plates 55, 56 which sandwich the opposite surfaces 26, 27 of the sheet 5.

According to a further different method, the further steps of bringing said sheet 2 onto a female half-mold 24, are comprised.

According to a further different method, the further steps are comprised of arranging frame 4 on and about said female half-mold 24 to surround, or at least partly surround, said female half-mold 24 so that gripping devices 5 may oscillate, translate or rotate and be arranged inclined with respect to said frame plane P, thus remaining outside the closing trajectory of the half-molds 23, 24 but facing the gap 58 which is gradually closed between the two half-molds 23, 24 so as to tension/pull or push said sheet 2 during the forming thereof.

According to a further different method, the further steps are comprised of moving or oscillating or rotating the pulling or thrust direction exerted by the gripping devices 5 with respect to said frame plane P and/or with respect to a direction which is perpendicular to said frame plane P.

According to a further different method, the further steps of opening said gripping devices 5 before the complete closing of the half-molds 23, 24, are comprised.

According to a further different method, the further steps of opening said gripping devices 5 at the complete closing of the half-molds 23, 24, are comprised.

According to a further different method, the further steps of opening said gripping devices 5 after the complete closing of the half-molds 23, 24, are comprised.

A preformed shell may be obtained due to such a method.

The provision of such a method allows a desired stress distribution to be obtained over the reinforced fabric sheet 2 during the step of exerting at least one deforming action of the reinforced fabric sheet 2. In other words, said method allows a desired stress distribution to be obtained over the reinforced fabric sheet 2 both during the preheating step and during the preforming step.

Preferably, the above-indicated steps are to be provided in sequence in the order indicated.

According to a possible operating method, said method comprises the further step of exerting at least one pulling pressure action on said reinforced fabric sheet. Preferably, said pulling pressure is an action distributed over a main portion of said reinforced fabric sheet 2.

According to a possible operating method, said step of exerting at least one pulling pressure action on said reinforced fabric sheet comprises the sub-step of exerting at least one preheating pulling pressure, which is performed in a preheating furnace 12.

According to a possible operating method, said step of exerting at least one pulling pressure action on said reinforced fabric sheet comprises the sub-step of exerting at least one preforming pulling pressure, which is performed in a preform mold 14.

According to a possible operating method, said step of gripping a plurality of edge portions 6 of the reinforced fabric sheet 2 with a plurality of gripping devices 5 is performed while keeping said plurality of edge portions 5 of the reinforced fabric sheet outside the preform mold 14. In other words, by gripping said plurality of edge portions 6, said assembly 1 keeps them outside the shape defined by the at least two mold half-shells 23, 24.

According to a possible operating method, said step of gripping a plurality of edge portions 6 of the reinforced fabric sheet 2 with a plurality of gripping devices 5 is performed while distributing, preferably uniformly distributing, said plurality of gripping devices 5 along the whole perimeter of the reinforced fabric sheet.

According to a possible operating method, said method comprises the further step of consolidating said preformed shell, for example by coating it with at least one layer of thermohardening material, preferably reticulated material.

Due to the above-described features provided separately from or together with one another in particular embodiments, an assembly, a plant and also a method are obtained, which allow the above-mentioned—sometimes contrasting—needs to be met, while providing the aforesaid advantages, and in particular:

- the preforming process of a reinforced fabric sheet for obtaining a preformed shell, may be automated;
- the stressing state during a deforming action of the reinforced fabric sheet, may be locally controlled;
- preformed shells in molds having complex three-dimensional shape and also from irregular-shaped reinforced fabric sheets may be obtained while ensuring optimal features of pleasant aesthetics of the reinforced fabric;
- the aesthetic design or pattern defined by said reinforced fabric is not locally distorted;
- a preformed shell consolidated with transparent or translucent thermohardening material is made so that the aesthetic pattern or design of the pre-impregnated fabric sheet is visible;
- a preformed shell may be made automatically both from a reinforced fabric sheet of the pre-impregnated or prepreg type or from a reinforced fabric sheet of the dry type.

A person skilled in the art may make many changes, adaptations and replacements to the embodiments described above or can replace elements with others which are functionally equivalent in order to satisfy contingent needs without however departing from the scope of protection of the appended claims.

According to a further embodiment again as shown in FIG. 26, an assembly 1 according to one embodiment comprises a robot 54, e.g. an anthropomorphic robot, which connects the manipulating end, or effector end, thereof to a frame 4 on which a plurality of gripping devices 5 is arranged.

Due to this assembly 1, at least one frame 4 may be automatically manipulated in a controlled manner and a plurality of gripping devices 5 may be moved in a controlled manner and for example, said frame 4 may be rotated to bring the gripping devices 5 with the jaws 19, 20 thereof in open position, and for example, the second jaws 20 ready to face a reinforced fabric sheet 2 to be gripped and manipulated.

According to a further embodiment again, frame 4 may be completely rotated due to this assembly 1, therefore by arranging the gripping devices downwards on this surface arranged beforehand and facing a support surface 57 of a loading station for picking at least one reinforced fabric sheet 2 to be manipulated.

According to a further embodiment again as shown in FIGS. 29 and 30, the anthropomorphic robot 54, or for example, a control station of the robot or of the anthropomorphic robots 60, moves frame 4 and controls the gripping devices 5 by picking at least one reinforced fabric sheet 2. After sheet 2 is gripped by the gripping devices 5, it is raised and turned upside-down so as to have the gripping devices 5 arranged on the upper side of frame 4. Sheet 2 is then brought to a preheating station 11 where frame 4 is arranged about opposed heating plates 55, 56 which are closed—without interfering with the gripping devices 5—against the opposite faces 26, 27 of the at least one reinforced fabric sheet 2 kept gripped by the gripping devices 5 arranged on frame 4.

According to a further embodiment again as shown in FIGS. 31 and 32, once the preheating of the reinforced fabric sheet 2 is complete, the plates 26, 27 of the preheating furnace 12 are opened and sheet 2 gripped by the gripping devices 5 is moved and brought towards a preform station 13 in which the half-molds 23, 24 are open.

According to a further embodiment again as shown in FIG. 33, robot 54 arranges frame 4 so as to surround the lower half-mold, or female half-mold 24, with the gripping devices 5 arranged close to the edge of the half-mold 24 and ready to guide the preheated reinforced fabric sheet 2 into gap 58 formed by the two closing half-molds 23, 24 by adjusting, with its gripping device 5 movements, the pulling of the edge portion 6 of reinforced fabric sheet 2 during the initial forming steps while the half-molds 23, 24 are closing, thus locally avoiding creases and distortions of fabric 2.

According to this invention, multi-layer sheets or sandwiches may also be preformed as depicted in FIG. 34, where for example, a shaped sheet, for example a shaped polyurethane sheet, is arranged between two reinforced fabric sheets.

According to a further embodiment again as depicted in FIG. 35, a preforming plant 10 comprises a loading station 44 of sheets 2 to be preformed, two opposite preheating stations 12, a robotic central assembly comprising an anthropomorphic robot 54 which supports a frame 4 on which a plurality of gripping devices 5 is arranged. Furthermore, the plant comprises a preform station 13, here a press with preforming half-molds 23, 24, a robot 61 for unloading the preformed sheet, a transport station 62 of the preformed sheets and a control station 60.

The times required to preheat the reinforced fabric sheet and continuously feed the preform station 13 may all be automatically optimized due to this solution.

According to a further embodiment again as depicted in FIG. 36, a plant 10 comprises, about a preform station 13, for example a preforming press in which there are arranged half-molds 23, 24, three anthropomorphic robots 54 suitable for manipulating support frames 4, each of a plurality of gripping devices 5 for simultaneously feeding mold 14 with two or more pre-shaped sheets 2 or cores for making sandwich components.

LIST OF REFERENCES

1 Assembly
2 Reinforced fabric sheet
3 Control and operating unit
4 Frame 5 Gripping device
6 Edge portion of reinforced fabric sheet
7 First moving device
8 Support
9 Frame cross member
10 Plant
11 Preheating station
12 Preheating furnace
13 Preform station
14 Preform mold
15 Pneumatic actuator
16 Support hinge
17 First support plate
18 Second support plate
19 First gripping device jaw
20 Second gripping device jaw
21 Gripping device carriage
22 Frame ground contact unit
23 First half-mold
24 Second half-mold or female half-mold
25 Half-mold convex face
26 First face of reinforced fabric sheet
27 Second face of reinforced fabric sheet
28 Thrust element or piston
29 Locking device
30 Knob
31 Display element
32 Guide element
33 Frame upright
34 Carriage engagement portion
35 Valve
36 Compressor
37 Position sensor
38 Approaching actuator
29 Distancing actuator
40 frame gripping element
41 manipulator robot
42 reinforced fabric sheet loading station
43 support surface for loading the sheet
44 unloading station of the formed sheet
45 support shoe
46 support guide
47 jaw control device
48 first geometrical coupling surface of first jaw
49 second geometrical coupling surface of second jaw
50 frame upper edge
51 frame inner edge
52 frame lower edge
53 support plate spring
54 manipulator robot or device
55 preheating furnace heating plate
56 opposite preheating furnace heating plate
57 support surface or loading station
58 gap present during the closing of the half-molds
49 multi-layer composite sheet
60 control station of the anthropomorphic robot(s)
61 preformed sheet unloading robot
62 transport station
α Inclination angle
M-M local moving direction
T-T longitudinal cross member direction
X-X Rotation axis parallel to the frame plane
Y-Y Rotation axis transverse to the frame plane
P frame plane

The invention claimed is:

1. An assembly for preforming a reinforced fabric sheet, said reinforced fabric sheet being intended to receive at least one deforming action for making a preformed shell, comprising:
at least one frame;
a plurality of gripping devices suitable for gripping the reinforced fabric sheet, said plurality of gripping devices being directly or indirectly associated with said at least one frame;
wherein:
each gripping device of said plurality of gripping devices being suitable for gripping an edge portion of the reinforced fabric sheet;
said assembly further comprises a moving system comprising a plurality of first moving devices;
wherein
the movement of each first moving device is independent of the other first moving devices;
each gripping device of said plurality of gripping devices being associated with one of said first moving devices;
each of said first moving devices being suitable for moving each gripping device of said plurality of gripping devices independently of the others so that when said reinforced fabric sheet is gripped by said plurality of gripping devices, each gripping device may move to guide localized deformations of the reinforced fabric sheet which arise during the deforming action of the reinforced fabric sheet,
a plurality of supports directly or indirectly associated with said frame, each support of said plurality of supports also being directly or indirectly associated with at least one gripping device so as to support said at least one gripping device; and
wherein each support is associated with a respective gripping device and a respective first moving device; and
wherein said first moving device is fastened to said support and each gripping device further comprises a carriage associated with said support and suitable for translating with respect to said support when moved by said first moving device; and
wherein at least one support comprises at least one support joint; and
wherein said support is associated with said frame via said support joint which guides the rotation of the support with respect to the frame.

2. An assembly according to claim 1, wherein
said frame defines a frame plane passing through said frame and which defines a plane wherein the reinforced fabric sheet is placed when, gripped by said plurality of gripping devices, it is held stretched, raised off all other supports or molds or half-molds; and wherein
second geometrical coupling surfaces of second jaw define a frame plane; and/or
wherein
said frame is suitable for surrounding said reinforced fabric sheet to grip an edge portion of the reinforced fabric sheet with said plurality of gripping devices and to exert a controlled pulling and/or thrust action in a direction both of the frame plane and outside the frame plane, thus allowing an inclined arrangement of the reinforced fabric sheet with respect to said frame including, to said frame plane;

and/or wherein
each of said gripping devices of said plurality of gripping devices is connected to said frame; and wherein
a first support plate is comprised between said gripping device and said frame; and wherein
said first support plate is connected to said frame; and/or wherein
a second support plate is comprised between one of said gripping devices of the plurality of gripping devices and said first support plate; and wherein
said second support plate is connected rotating to said first support plate so as to oscillate and be positioned also tilted with respect to said frame and/or with respect to said frame plane; and/or wherein
at least one support shoe is comprised between one of said gripping devices of the plurality of gripping devices and said second support plate; and wherein said gripping device is connected to a support guide; and wherein
said support guide is slidingly housed in said support shoe;
and/or wherein
said gripping device comprises at least a first gripping device jaw which acts in conjunction with a second gripping device jaw; and wherein
at least one of said first and second gripping device jaw is movable so as to move away from and/or close to the other gripping device jaw, thus opening and closing said gripping device;
and/or wherein
said assembly further comprises a jaw control device; and wherein
said at least one of said first and second gripping device jaw is connected to said jaw control device for opening said at least one of said first and second gripping device jaw in an operated and/or controlled manner;
and/or wherein
said first support plate is connected to said frame in a rotating manner; and/or wherein
said first support plate is connected to said frame in a rotating manner about a rotation axis arranged orthogonal to said frame plane; and/or wherein
said first support plate is connected to said frame in a rotating manner and is elastically and constantly stressed in a predefined angular position; and/or wherein
said first support plate is connected to said frame in a rotating manner and the angular rotation thereof is controlled; and/or wherein
said first support plate is connected to said frame in a rotating manner and the angular rotation thereof is operated in a controlled manner; and/or wherein
said second support plate is constantly stressed towards said first support plate;
and/or wherein
said second support plate is elastically and constantly stressed towards said first support plate; and/or wherein
the oscillation of said second support plate is controlled with respect to said first support plate; and/or wherein
the oscillation of said second support plate is operated in a controlled manner with respect to said first support plate; and/or wherein
said assembly comprises a support plate spring, and wherein said spring is connected, with a first end thereof, to said first support plate, and to said second support plate with the opposite end; and/or wherein
said first gripping device jaw comprises a first geometrical coupling surface of first jaw; and wherein
said second gripping device jaw comprises a second geometrical coupling surface of second jaw; and wherein
said first geometrical coupling surface of first jaw geometrically couples with said second geometrical coupling surface of second jaw when said gripping device is in closed position, thus forming a winding clamping path therebetween for the gripping or grasping of said reinforced fabric sheet;
and/or wherein
said frame comprises a frame upper edge, a frame inner edge facing said reinforced fabric sheet and adjacent to said frame upper edge, and a frame lower edge, opposite to said frame upper edge and adjacent to said frame inner edge; and wherein
said plurality of gripping devices is arranged on said frame upper edge;
and/or wherein
said plurality of gripping devices each comprises a first gripping device jaw suitable for acting in conjunction with a second gripping device jaw to grip an edge portion of a reinforced fabric sheet, wherein
said second jaw overhangingly protrudes from said frame upper edge to form an overhanging support surface when said gripping device is in an open positon ready to move close to said edge portion; and/or wherein
said first jaw is moved away from said second jaw, leaving a path orthogonal to a second geometrical coupling surface of second jaw free from obstacles to allow the reinforced fabric sheet to approach resting on said second jaw;
and/or wherein
said assembly comprises a manipulator robot or device, and wherein
said robot is connected to said frame to manipulate said frame in a controlled manner; and/or wherein
said robot controls said plurality of gripping devices to open and close; and/or wherein
said robot manipulates said frame to pick at least one reinforced fabric sheet and/or to bring said sheet to a preheating station and/or to bring said sheet to a preform station and/or to extract said preformed sheet from a mold;
and/or wherein
the independent movement of each gripping device of said plurality of gripping devices is controlled according to the local force or the local pulling pressure undergone by the reinforced fabric sheet to obtain a local stressing distribution of desired value over the reinforced fabric sheet.

3. An assembly according to claim 1, comprising at least one sensor which locally detects the force of the pulling pressure undergone by the reinforced fabric sheet; and/or wherein
said assembly comprising at least one control and operating unit and at least one sensor which locally detects the force or traction pressure to which the sheet of reinforcement fabric was subjected, said at least one control and actuating unit receives information from said at least one sensor and transmits at least one control signal to the moving system; or wherein said assembly comprising at least one control and operating unit and said control and operating unit controls the actuation of said moving system in a closed loop feedback manner; or wherein said assembly comprising at least one control and operating unit and said control and operating unit controls the actuation of said moving system in open loop.

4. An assembly according to claim 1, wherein said first moving device comprises at least one pneumatic actuator or at least one electrically-operated actuator; or wherein said first moving device comprises at least one pair of counter actuators suitable for acting in conjunction to move the gripping device in opposite directions along a local moving direction.

5. An assembly according to claim 1, wherein said support joint is at least one of: a hinge, bushing, spherical joint suitable for forming a ball joint, and a universal joint; or wherein said support comprises a first plate associated with said frame and a second plate associated at least with said gripping device, wherein said support joint connects said first plate and said second plate to each other, thus guiding the related rotary-translational movement between said first plate and said support plate about a movement axis (X-X) and/or (Y-Y), thereby forming an articulated support and defining an inclination angle ($\alpha$) between said first plate and said second plate of the support.

6. An assembly according to claim 1, wherein said moving system further comprises at least a second moving device suitable for moving each support independently of the other supports with respect to said frame; or wherein each first moving device is movable independently of each second moving device; or wherein said first moving device and a second moving device adapted to move each support with respect to said frame independently of the other supports are integrated in a single component.

7. An assembly according to claim 1, wherein said moving system comprises at least one elastic element which provides an elastic action which keeps said reinforced fabric sheet preloaded by keeping it locally stretched.

8. An assembly according to claim 1, wherein said plurality of gripping devices is distributed, including distributed in a uniform manner, along the perimeter of the reinforced fabric sheet.

9. A plant for preforming a reinforced fabric sheet, comprising:

at least one assembly according to claim 1;

at least one preheating station, comprising at least one preheating furnace;

at least one preform station, comprising at least one preform mold.

* * * * *